United States Patent [19]

Hashimoto et al.

[11] Patent Number: 5,751,293

[45] Date of Patent: May 12, 1998

[54] PATTERN GENERATION METHOD AND APPARATUS FOR AUTOMATIC GENERATION OF CONTINUOUS TILE PATTERNS ALONG ANY ARBITRARY SIDE

[75] Inventors: Akihiko Hashimoto, Yokosuka; Yasuhiko Watanabe, Yokohama, both of Japan

[73] Assignee: Nippon Telegraph and Telephone Corp., Tokyo, Japan

[21] Appl. No.: 517,929

[22] Filed: Aug. 22, 1995

[30] Foreign Application Priority Data

Aug. 24, 1994 [JP] Japan .................................. 6-199734

[51] Int. Cl.[6] .......................................... G06T 1/00
[52] U.S. Cl. .......................... 345/430; 345/437; 345/441
[58] Field of Search .................................. 395/130, 129, 395/117; 345/430, 437, 441

[56] References Cited

U.S. PATENT DOCUMENTS

| 5,194,969 | 3/1993 | DiFrancesco | 358/463 |
|---|---|---|---|
| 5,211,692 | 5/1993 | Lalvani | 373/157 R |
| 5,295,237 | 3/1994 | Park | 345/437 |
| 5,428,719 | 6/1995 | Sato | 345/429 |
| 5,450,533 | 9/1995 | Takhashi et al. | 345/117 |
| 5,577,182 | 11/1996 | Hayashi | 345/437 |

FOREIGN PATENT DOCUMENTS

| 0 473 152 | 3/1992 | European Pat. Off. |
| 0 489 582 | 6/1992 | European Pat. Off. |
| 0 535 895 | 4/1993 | European Pat. Off. |
| 0 535 987 | 4/1993 | European Pat. Off. |
| 0 588 283 | 3/1994 | European Pat. Off. |
| 0 667 595 | 8/1995 | European Pat. Off. |
| WO 92/10904 | 6/1992 | WIPO |

OTHER PUBLICATIONS

Xia, Weixin, et al., "Periodic Pattern Graphics", *Computers & Graphics*, vol. 18, No. 1, pp. 81–86, 1994.

Fournier, Alain, et al., "Computer Rendering of Stochastic Models", *Communications of the ACM*, vol. 25, No. 6, pp. 371–384, Jun. 1982.

*Primary Examiner*—Phu K. Nguyen
*Assistant Examiner*—Jae-Hee Choi
*Attorney, Agent, or Firm*—Pollock, Vande Sande & Priddy

[57] ABSTRACT

A coordinate address is generated which specifies the position in a square original tile area where pattern data is to be written for each pixel, and a check is made to determine if the coordinate address is adjacent any one of sides of the original tile area. When the written pixel is adjacent any one of sides of the original tile area, the position of a pixel is calculated which is adjacent the written pixel on another tile area adjacent the original tile area along that side, and the position of the adjacent pixel when the adjacent tile area is laid on the original tile area is calculated as a shifted position of the adjacent pixel. The positions of the written pixel and the shifted position are rotated predetermined angle about the center of a polygon at least once to obtain rotational positions. Pixel values are additionally written at these shift and rotational positions.

27 Claims, 23 Drawing Sheets

5,751,293

1

PATTERN GENERATION METHOD AND APPARATUS FOR AUTOMATIC GENERATION OF CONTINUOUS TILE PATTERNS ALONG ANY ARBITRARY SIDE

BACKGROUND OF THE INVENTION

The present invention relates to method and apparatus for generating patterns for building materials, interior finishing materials and exterior facing materials which are arranged side by side in a plane, such as tiles, wall paper and tile carpets.

In the case of tiles and similar industrial products, printing patterns on them is important for increasing their value. Incidentally, if patterns on adjacent tiles arranged side by side on a wall surface are smoothly continuous with each other across the boundary of the tiles without making the boundary noticeable, the patterns would be seen as if it were a single smooth pattern spreading over the entire wall area. Furthermore, when tiles with the same pattern (a basic tile pattern) are merely arranged in the same orientation, the same pattern variation repeatedly appear every tile; hence, the tiles individually stand out for each pattern. When tiles are laid in different orientations or a small number of tiles with different patterns are laid, if the patterns can be made to continue across the boundaries of the tiles, their appearance is improved since they can be regarded as a single pattern.

Moreover, it would be preferable from the viewpoint of increasing diversity of tiles if plural kinds of tiles, which have patterns continuous with each other across the boundaries of adjacent tiles and have different patterns in marginal areas, can be laid in a plane in a random combination. Aside from the formation of simple geometric patterns or manual drawing of approximate patterns, however, it is difficult to generate a plurality of patterns which continue across the boundaries of them. Besides, it is only about two kinds of such patterns that can be generated, and the boundary of the tiles somehow appears; hence, at least four kinds of basic tile patterns are required. However, the preparation of tiles each having a plurality of patterns present problems in terms of mass-producing cost, distribution cost and complexity of handling.

SUMMARY OF THE INVENTION

An object of the present invention is to provide a method and apparatus which solves the above-mentioned problems of the prior art and permit automatic generation of tile patterns which continue across boundaries of tiles even if they are arranged side by side along any arbitrary sides thereof.

Another object of the present invention is to provide a method and apparatus which permit automatic generation of tile patterns having substantially the same density of pattern elements in the boundary and inner areas of each of the tiles arranged side by side.

Still another object of the present invention is to provide a method and apparatus which permit efficient generation of fractal patterns in a square area.

In a first aspect, the present invention is directed to a method which writes a pixel value of a pattern in an area of a polygonal tile for each pixel so that the pattern may continue across the boundary of the tiles arranged side by side. This method comprises the steps of:

(a) writing a pixel value of a pattern in said tile area for each pixel;

2

(b) making a check to see if said written pixel of the pattern is adjacent any one of sides of said polygon;

(c) when said pixel written in said step (b) is adjacent any one of the sides of said polygon, calculating the position of a pixel adjacent said written pixel on the area of an adjacent polygon adjacent said polygon along said side thereof and calculating, as a shifted position of said adjacent pixel, the position of said adjacent pixel when said adjacent polygon is laid on top of said tile area;

(d) rotating the position of said written pixel and said shifted position about the center of said polygon at least once through a predetermined angle and calculating the rotated positions; and (e) writing said pixel value at said shifted position and said rotated positions.

In a second aspect, the present invention, is directed to a method which generates a tile pattern by repeatedly writing a predetermined pattern element in a polygonal tile area and in which a square area including said pattern element is defined as a stamp area and a boundary area where said stamp area, whenever placed there, spreads across the boundary of said tile area and an inner area where said stamp area, when placed there, does not spread across said boundary are defined in said tile area. This method comprises the steps of:

(a) randomly generating the center position of said stamp area in said tile area;

(b) making a check to see if the stamp area having its position specified by said center position is inside said boundary area or inside said inner area;

(c) if said stamp area is inside said inner area, writing said pattern element at said specified position of said stamp area;

(d) if said stamp area is inside said boundary area, shifting an outer portion of said pattern element which extends out of said boundary into an adjacent polygonal area to a position on said tile area when said adjacent polygonal area is laid on top of said tile area, and effecting an additional write at positions to which an inner portion of said pattern element which lies inside said boundary and said shifted portion are rotated a predetermined angle about the center of said tile area at least once in accordance with a connecting condition of said tile; and (e) when said additional write has been effected, effecting at least one additional write in said inner area.

According to a third aspect of the present invention, in the second aspect the number of additional writes in said inner area may be determined so that the density of pattern elements in said boundary area and the density of pattern elements in said inner area become substantially equal to each other.

According to a fourth aspect of the present invention, in the second aspect the orientation of said pattern element may be rotated, for each write of said pattern element, by an angle corresponding to predetermined orientations for connection of said polygonal tile in any of said steps (c), (d) and (e).

According to a fifth aspect of the present invention, in the second aspect said step (b) includes a step of writing in memory means the write position of said stamp area decided to spread across said boundary in the generation of a first tile pattern, and the generation of a second tile pattern comprises the steps of:

(f) reading out said write position from said memory means;

(g) writing said pattern element at said read-out write position in said boundary area; and (h) letting the area ratio of said inner area and said boundary area be represented by SI/SB, randomly generating the center position of said stamp area in said inner area by the number of times of writing about $S_I/S_B$ times the number of times of writing in said boundary area in said step (g) and writing said pattern element at said center position.

According to a sixth aspect of the present invention, in the fifth aspect said write by said step (g) and said write by said step (h) are effected mixedly.

In a seventh aspect, the present invention is directed to a method which generates a fractal pattern on an original square area defined by four apexes. The method comprises the steps of:

(a) randomly selecting one of two pairs of diagonally opposite apexes of each of square areas arranged in a matrix form in said original square area and respectively having pixel values at four apexes and writing a value obtained by adding noise to an average value of said pixel values at two apexes of said selected pair, as a pixel value of a midpoint between said two apexes which defines the center point of said each square area;

(b) defining four rhombic areas every four of which use four sides of said each square area as their diagonal lines, respectively, and commonly use the center point of said each square area as one of four apexes of each of said four rhombic areas;

(c) randomly selecting one of two pairs of diagonally opposite apexes of each of said four rhombic areas and writing, as a pixel value at the center point of said each rhombic area, a value obtained by adding noise to an average value of pixel values at the two apexes of said selected pair;

(d) defining square areas every four of which use four sides of said each rhombic area as their diagonal lines, respectively, and commonly use the center point of said each rhombic area as one of four apexes of each of said four square areas; and (e) repeating said steps (a) through (d) on the basis of said each square area defined by said step (d).

According to an eighth aspect of the present invention, in the seventh aspect, said step (c) comprises the steps of:

(c1) making a check to see if any one of apexes of said each rhombic area is outside of a predetermined first side of said original square area or all apexes of said each rhombic area are on said original square area;

(c1) when one apex is outside said first side of said original square area,.

(c2-1) selecting a pixel at least one position in said original square area which corresponds to the position of said one apex and setting said selected pixel as the pixel at said apex outside said first side of said original square area;

(c2-2) randomly selecting one of two pairs of diagonally opposite apexes of said each rhombic area and determining, as a pixel value to be written at the center point of said each rhombic area, a value obtained by adding noise to an average value of pixel values at the two apexes of said selected pair;

(c2-3) determining a first position of said center point of said each rhombic area on said first side, a second position obtained by translating said first position to a second side opposite said first side, and at least third and fourth positions which are obtained by rotating said first and second positions about the center point of said original square area by an integral multiple of 90° in accordance with the condition of orientation for connection of said tile, and writing said determined pixel value at said first through fourth positions; and (c3) when all apexes are on said original square area, randomly selecting one of two pairs of diagonally opposite apexes of said each rhombic area and writing, as the pixel value at the center point of said each rhombic area, a value obtained by adding noise to an average value of the pixel values at the two apexes of said selected pair.

According to a ninth aspect of the present invention, in the seventh aspect said step (c) comprises the steps of:

(c1) making a check to see if any one of apexes of said each rhombic area is outside a predetermined first side of said original square area or all apexes are on said original square area;

(c2) when one apex is outside of said first side of said original square area, (c2-1) making selectable, as the pixel at said apex outside said first side, pixels at a total of J positions including the position in said original square area corresponding to the position of said one apex and positions to which said position is rotated at least once by an integral multiple of 90° in accordance with the condition of the orientation for connection of said tile, and forming J selectable pairs each as the pairs of diagonally opposite apexes having said apex outside said first side;

(c2-2) randomly selecting one of J+1 pairs, including a pair of apexes on said original square area, and determining, as a pixel value to be written at the center point of said each rhombic area, a value obtained by adding noise to an average value of the pixel values at the two apexes of said selected pair;

(c2-3) determining a first position of said center point of said each rhombic area on said first side, a second position obtained by translating said first position to a second side opposite said first side and at least third and fourth positions obtained by rotating said first and second positions about the center point of said original square area by an integral multiple of 90° in accordance with the condition of the orientation for connection of said tile, and writing said determined pixel value at said first through fourth positions; and (c3) when all apexes are on said original square area, randomly selecting one of two pairs of diagonally opposite apexes of said each rhombic area and writing, as the pixel value at the center point of said each rhombic area, a value obtained by adding noise to an average value of the pixel values at the two apexes of said selected pair.

In a tenth aspect, the present invention is directed to an apparatus which generates by writing a pixel value of a pattern in an area of a polygonal tile for each pixel so that the pattern may continue across the boundary of the tiles arranged side by side. The apparatus comprises:

pattern data source means;

coordinate address generating means which specifies the position in said polygonal area where said pattern data from said pattern data source means is to be written for each pixel;

decision means which decides whether said coordinate address is adjacent to any one of sides of said polygonal area;

position rotating means which, when said written pixel is adjacent any one of said sides of said polygonal area, calculates the position of a pixel adjacent said written pixel on a polygonal area adjacent said side of said polygonal area, calculates, as a shifted position of said adjacent pixel, the position of said adjacent pixel when said adjacent polygonal area is laid on said polygonal tile area, and calculating rotated positions of the position of said written pixel and said shifted position by rotating said positions predetermined angle about the center of said polygonal area at least once; and additional write means which additionally writes said pixel value at said shifted position and said rotated positions.

In an eleventh aspect, the present invention is directed to an apparatus which generates a tile pattern by repeatedly writing a predetermined pattern element in a polygonal tile area and in which a square area including said pattern element is defined as a stamp area and a boundary area where said stamp area, whenever placed there, spreads across the boundary of said tile area and an inner area where said stamp area, when placed there, does not spread across said boundary are defined in said tile area. The apparatus comprises:

pattern element source means which outputs said pattern element;

center coordinate generating means which randomly generates in said tile area the center position of said stamp area which specifies the position in said square area where said pattern element is to be written;

decision means which decides whether said stamp area where said pattern element has been specified to be written by said center position of said stamp area is inside said boundary area or inside said inner area; and write means responsive to the results of decision by said decision means, which, when said stamp area is in said inner area, writes said pattern element at said specified position in said stamp area and which, when said stamp area is in said boundary area, shifts an outer portion of said pattern element which extends out of said boundary into an adjacent polygonal area to a position on said tile area where said adjacent polygonal area is laid on top of said tile area, and effects an additional write at positions to which an inner portion of said pattern element which lies inside said boundary and said shifted portion are rotated a predetermined angle about the center of said tile area at least once in accordance with a connecting condition of said tile, which effects at least one additional write in said inner area when said additional write was made.

In a twelfth aspect, the present invention is directed to an apparatus which generates a fractal pattern on an original square area defined by four apexes, and the apparatus comprises:

memory means wherein there are stored pixel values assigned to said four apexes which define said original square area;

random generating means for generating a random number;

noise generating means for generating noise;

select means which responds to said random number to randomly select one of two pairs of diagonally opposite apexes of each of square areas which are arranged in a matrix form and each have pixel values at four apexes;

pixel value calculating means which calculates a pixel value by adding said noise to an average value of pixel values at two apexes of said selected pair;

write means which writes said pixel value into said memory means as the pixel value at the midpoint between said two apexes which defines the center point of said each square area; and control means which defines four rhombic areas which use four sides of said each square area as their diagonal lines, respectively, and commonly use the center point of said each square area as one of four apexes of each of said four rhombic areas;

wherein said select means includes means for randomly selecting one of two pairs of diagonally opposite apexes of said each rhombic area in accordance with said random number;

wherein said pixel value calculating means includes mans for calculating a pixel value by adding noise to an average value of pixel values at two apexes of said selected pair;

wherein said write means includes means for writing said pixel value into same memory means as the pixel value at the center point of said each rhombic area; and wherein said control means includes means which defines square areas using sides of said each rhombic area as their diagonal lines, respectively, and using the center point of said each rhombic area as their common apex and which repeats the defining of said each rhombic area on the basis of said each square area.

DESCRIPTION OF THE PREFERRED EMBODIMENTS

To facilitate a better understanding of the present invention, a description will be given first of the basic principles of the invention on which patterns of a given one of square tiles, when arranged in a matrix form, always continue to patterns of the surrounding tiles at the boundaries between them. Incidentally, the rectangle mentioned herein includes squares.

Now, assume that square tiles Ta and Tb having each side of a length W are arranged side by side and have patterns containing line segments L which are continuous with each other across the boundary B of the two tiles. Let the coordinates of pixels $P_a$ and $P_b$ closest to each other on the line segments L with respect to the boundary B be represented by $(x_a, y_a)$ and $(x_b, y_b)$, respectively. In order that there may exist on the tile Tb the pixel $P_b$ which is continuous with the pixel $P_a$ of the tile Ta irrespective of which side of the tile Tb is adjacent the tile Ta, it is necessary that the tile Tb have pixels $P_{b1}$, $P_{b2}$ and $P_{b3}$ which will assume the same position as that of the pixel $P_b$ when the tile Tb is turned 90, 180 and 270 degrees, respectively. Conversely, in order that there may exist on the tile Ta the pixel $P_a$ which is continuous with the pixel Pb of the tile Tb irrespective of which side of the tile Ta is adjacent the tile Tb, it is necessary that the tile Ta have pixels $P_{a1}$, $P_{a2}$ and $P_{a3}$ which will assume the same position as that of the pixel $P_a$ when the tile Ta is turned 90, 180 and 270 degrees, respectively. The tiles Ta and Tb satisfy these two conditions when pixels $P_a$, $P_{a1}$, $P_{a2}$, $P_{a3}$ and $P_b$, $P_{b1}$, $P_{b2}$, $P_{b3}$, which meet the above-mentioned two conditions, are present on four sides of the same square with the tiles Ta and Ta laid one on top of the other. Hence, even if two freely selected tiles are placed side by side with any given sides adjoining, patterns of the tiles that are continuous with each other across the boundary between them needs only to be generated as described below.

Figure 1A:
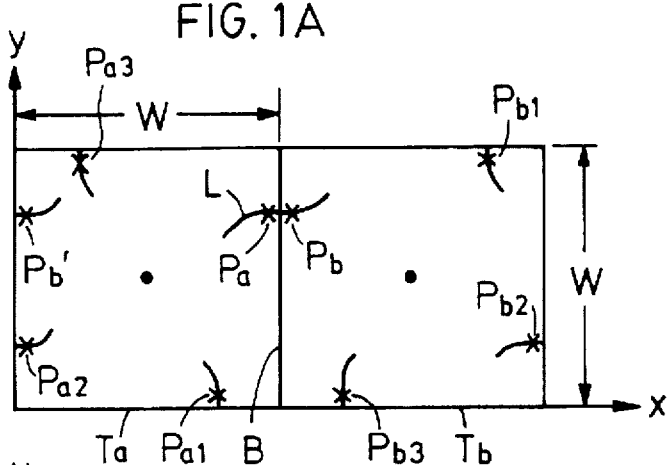
FIG. 1A is a diagram showing a square area of a tile and an adjoining square area, for explaining the principles of the present invention.
Figure 1B:
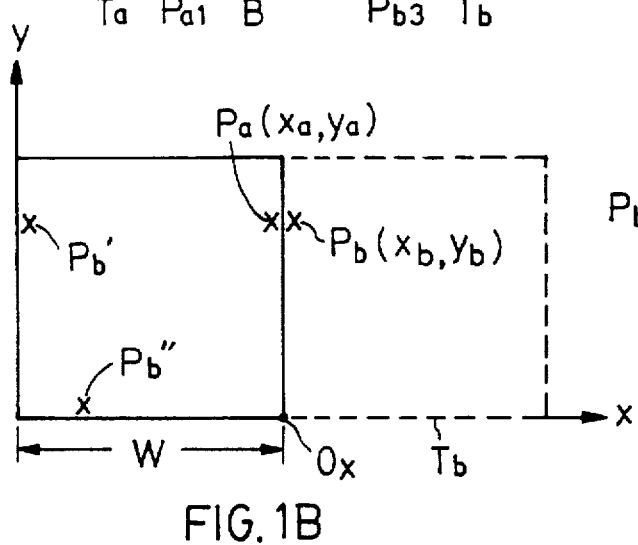
FIG. 1B is a diagram for further explaining the principles of the present invention.

(a) When there is a pixel value which is to be written at a position $(x_a, y_a)$ adjacent any one of the sides of the tile Ta as shown in FIG. 1B in the course of sequentially writing pixel values at positions of pixels that form a pattern on the tile Ta, the position $(x_b, y_b)$ of the pixel $P_b$ on the adjoining tile Tb is calculated which is adjacent the pixel $P_a$.

(b) The position of the pixel $P_b'$, with the tile Tb shifted onto the tile Ta, is calculated, for example, as $(x_b - W, y_b)$ as shown in the FIG. 1B.

Figure 1C:
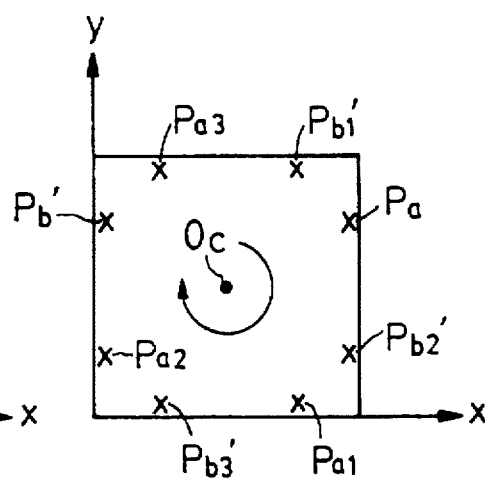
FIG. 1C is a diagram for still further explaining the principles of the present invention.

(c) Positions of pixels $P_a$, $P_{a1}$, $P_{a2}$, $P_{a3}$ and $P_b'$, $P_{b1}'$, $P_{b2}'$, $P_{b3}'$, with the pixels $P_a$ and $P_b'$ turned 90, 180 and 270 degrees about the coordinate (Xc, Yc) of the center Oc of the tile Ta as shown in FIG. 1C, are determined, and pixel values are written at the thus determined pixel positions. When the pixel $P_a$ adjacent the boundary is present, pixels are additionally written adjacent the boundary by the above-mentioned steps (a), (b) and (c); the pattern formed by these pixels adjacent the boundary is continuous with the pattern of the adjoining tile.

The above description has been given of the case of the square tile; in the case of a rectangular tile whose adjacent sides have different lengths, the pixels need only to be turned 180 degrees in the above-mentioned step (c). Furthermore, in the case of square tiles, the adjoining tile Tb need not always be translated onto the tile Ta in step (b) but may also be laid on top of the latter by turning the former to the left through 90 degrees about one end Ox of the adjacent side, followed by calculating the position of a pixel $P_b''$ in place of the pixel $P_b$.

Figure 2:
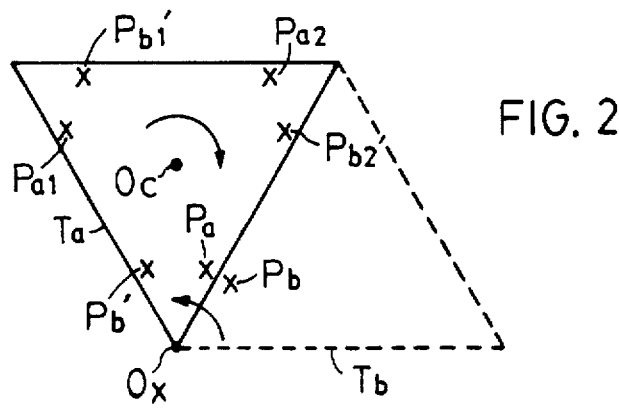
FIG. 2 is a diagram for explaining the principles for the application of the present invention to a regular triangular tile.

Similar principles can also be applied to regular triangular and regular hexagonal tiles. FIG. 2 shows the application of the principles to the regular triangular tiles. For example, when a pixel $P_a$ is present adjacent one side of a triangular tile Ta, the position of a pixel $P_b$ on the adjoining triangular tile Tb which is adjacent the pixel $P_a$ is calculated, then the triangular tile Tb is laid on top of the triangular tile Ta by turning the former to the left through 60 degrees about one end Ox of the side adjacent thereto and the position of a pixel $P_b'$ is calculated. Next, the triangular tile Ta is turned 120 and 240 degrees about its center Oc, by which pixel positions $P_{a1}$, $P_{a2}$ and $P_{b1}'$, $P_{b2}'$ can be obtained.

Figure 3:
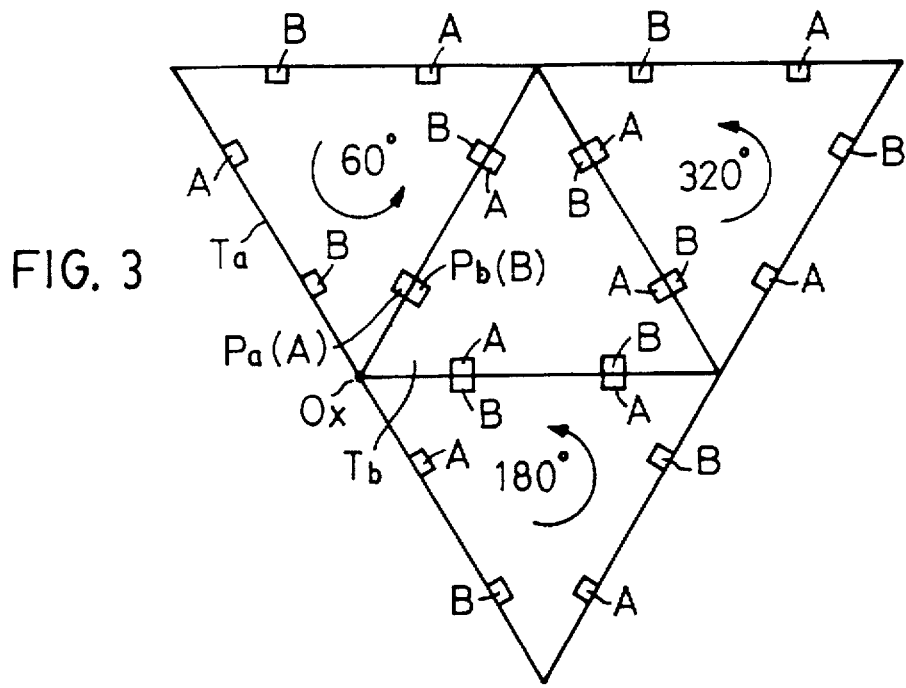
FIG. 3 is a diagram for explaining pattern continuation conditions in the regular triangular tile.

FIG. 3 shows pixels A and B which meet the pattern continuation conditions described above in respect to FIG. 2 and hence are continuous with each other across the boundaries of the above-mentioned triangular tiles Ta and Tb which are laid in a plane.

Figure 4:
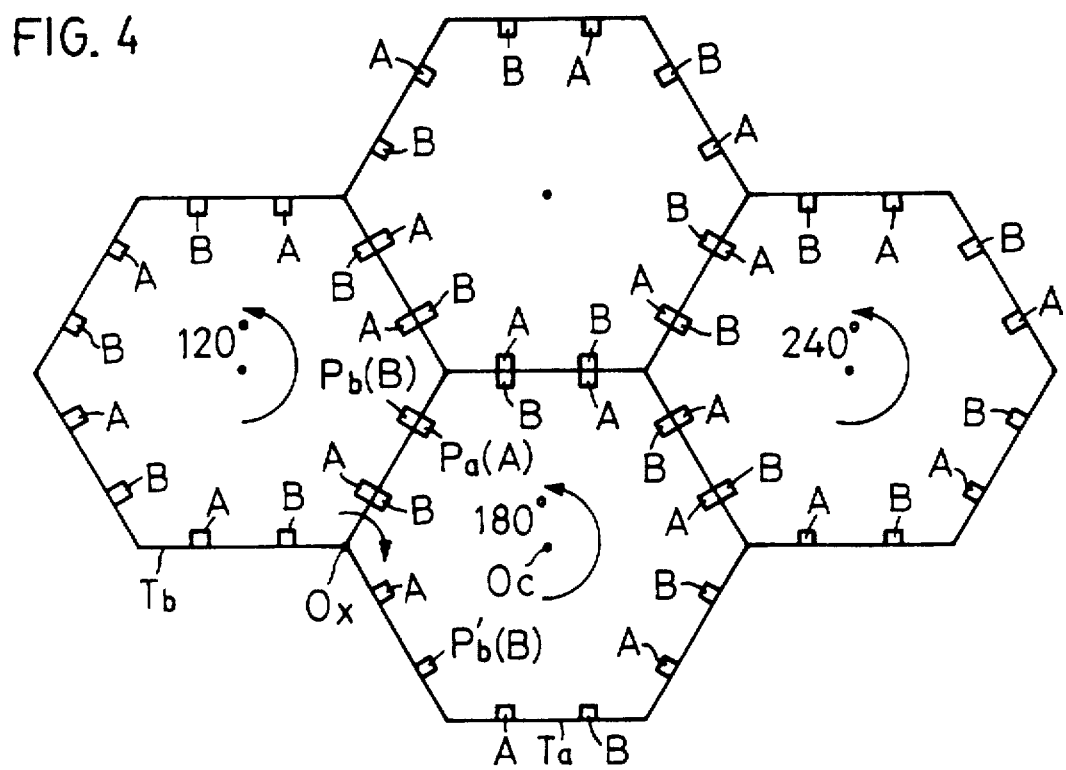
FIG. 4 is a diagram for explaining pattern continuation conditions in a regular hexagonal tile.

FIG. 4 shows patterning which ensures continuity of patterns at the boundaries between regular hexagonal tiles which are laid in a plane. In this example, when there is the pixel $P_a$ to be written adjacent the boundary of the tile Ta, the coordinate of the pixel Pb on the tile Tb which is adjacent the pixel $P_a$ across the boundary is calculated, then the tile Tb is turned to the right through 120 degrees about one end Ox of the boundary side thereof and the coordinate of the position $P_b'$ of the pixel $P_b$ on the tile Ta is determined. Next, the coordinates of the pixels $P_a$ (identified by A) and $P_b'$ (identified by B) are calculated after turning the tile Ta through 60, 120, 180, 240 and 300 degrees one after another and values are written into pixels at the calculated coordinate positions. Patterns of the tiles thus prepared always continue across the boundaries of the tiles irrespective of which side of each tile adjoins which side of the other tile.

Next, a description will be given, with reference to FIG. 5, of a device for drawing many predetermined patterns, for example, circles, on a tile through utilization of this invention method described above. Assume that a square tile having one side of a length W is defined on the X-Y coordinate system as shown in FIG. 6A. In this example, positions of pattern elements to be written on the tile are generated randomly as center coordinates (Xc, Yc) of the elements and a circle of a radius R, shown in FIG. 6B, is written on the tile with each center coordinate at its center. In this case, however, let it be assumed that pixel value to be written on the tile are written in a pattern data memory 18.

In a pattern element memory 11 each pixel value on the circle (hereinafter referred to as pattern element) of the radius R depicted in FIG. 6B is prestored at the address corresponding to the coordinate (x, y) of the pixel. An address generating part 12 sequentially generates all addresses (x, y) of a square area $R_s$ including the pattern element C in the pattern element memory 11 each time a center coordinate generating part 13 generates one center coordinate (Xc, Yc) of the pattern element to be written. The center coordinate generating part 13 randomly generates center coordinates (Xc, Yc) within the ranges of $0 \leq Xc \leq W$ and $0 \leq Yc \leq W$. A coordinate combing part 14 combines the readout address generated by the address generating part 12 and the center coordinate (Xc, Yc) from the center coordinate generating part 13 and outputs a combined coordinate (x+Xc, y+Yc). In this embodiment, when a circle C that is a pattern element to be written on the tile Ta lies across the boundary of the tile as shown in FIG. 6A, the circle C is written on the tile Ta and the adjoining one Tb in such a manner that its circular arc portion $C_b$ protruding from the tile Ta continuously extends onto the adjoining tile Tb at the boundary between them. To perform this, an area transformation part 15 performs operations, $X=(x+Xc) \bmod W$ and $Y=(y+Yc) \bmod W$, by which the coordinates of each pixel on the circular arc portion $C_b$ protruding out from the tile Ta as shown in FIG. 6A are transformed to $X=(x+Xc) \bmod W=x+Xc-W$ and $Y=(y+Yc) \bmod W=y+Yc-W$. Based on the radius R and center coordinate of the circle C, an area decision part 16 makes a check to see if the circle C lies on the boundary of the tile Ta (any one of four sides). That is, if at least either one of conditions $W-Xc<R/2$ and $W-Yc<R/2$ is satisfied, it is judged that the circle C lies on the boundary. A coordinate rotating part 17 follows the judgement of the area decision part 16; when the circle C is not on the boundary, the coordinate rotating part 17 uses the combined coordinate (X, Y) from the area conversion part 15 as an address to write in the pattern data memory 18 a pixel value read out of the pattern element memory 11 on the basis of the above-mentioned coordinate (x, y). When the pixel value read out of the memory 11 is zero, no write is effected in the memory 18. When it is decided that the circle C is on the boundary, the coordinate rotating part 17 uses the combined coordinate (X, Y) as an address to write in the memory 18 a pixel value similarly read out of the address (x, y) in the memory 11. At the same time, the coordinate rotating part 17 calculates coordinates $(X_1, Y_1)$, $(X_2, Y_2)$ and $(X_3, Y_3)$ which result from turning the combined coordinate (X, Y) through 90°, 180° and 270°, respectively, and writes pixel values similarly read out of the memory 11 into the memory 18, using the above-said coordinates as addresses. When the pixel values red out of the memory 11 are zero, no write is effected in the memory 18.

Figure 6A:
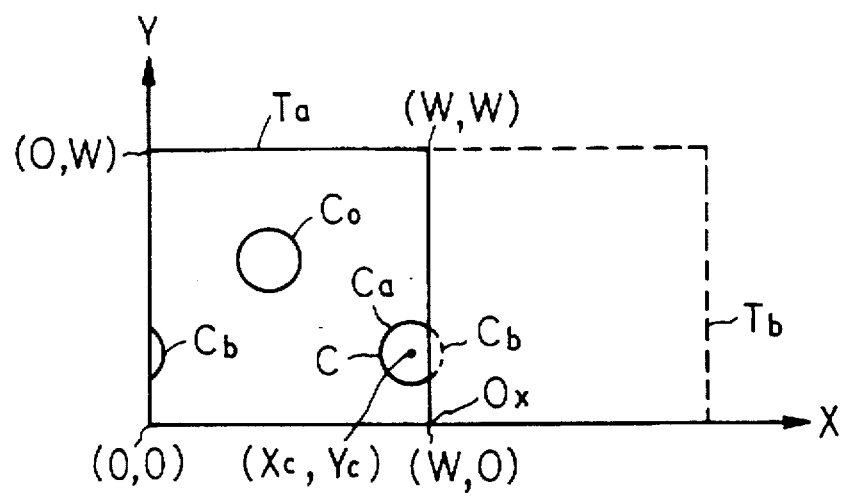
FIG. 6A is a diagram for explaining continuation conditions for pattern element in a square tile.
Figure 6B:
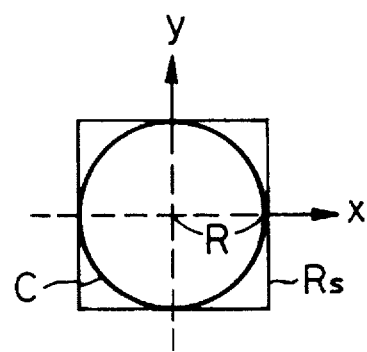
FIG. 6B is a diagram for explaining the pattern continuation conditions.
Figure 6C:
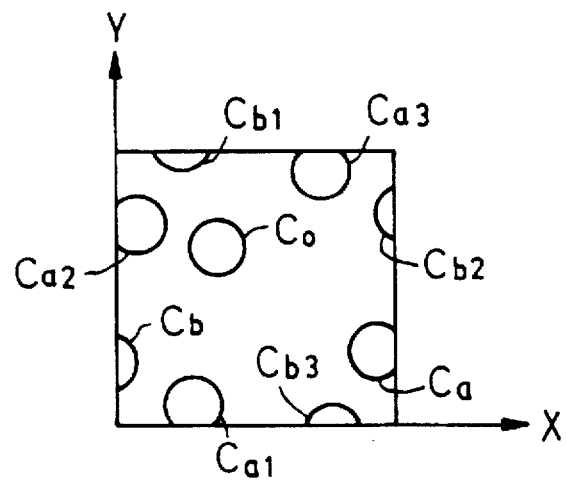
FIG. 6C is a diagram showing a stamp area including a pattern element.

The processing described above is performed for all addresses (x, y) which scan the square area $R_s$ of the element memory 11, by which the pattern is generated for one of the center coordinates generated by the center coordinate generating part 18; then, center coordinates are randomly generated and the same processing as described above is repeated. With respect to the center coordinate of a circle $C_0$ judged by the area decision part 16 not to cross any boundaries of the tile Ta as depicted in FIG. 6C, one complete circle $C_0$ is written into the memory 18. With respect to the center coordinate of a circle judged to across the boundary, two circular arcs $C_a$ and $C_b$ split by the boundary and sets of circular arcs $(C_{a1}, C_{b1})$, $(C_{a2}, C_{b2})$ and $(C_{a3}, C_{b3})$, which are obtained by turning the two circular arcs $C_a$ and $C_b$, are written into the data memory 18. As is evident from FIG. 6C, when tiles having patterns thus generated are arranged in contact with each other, the patterns continue across the boundaries of the tiles, no matter which sides of the tiles adjoin.

Figure 5:
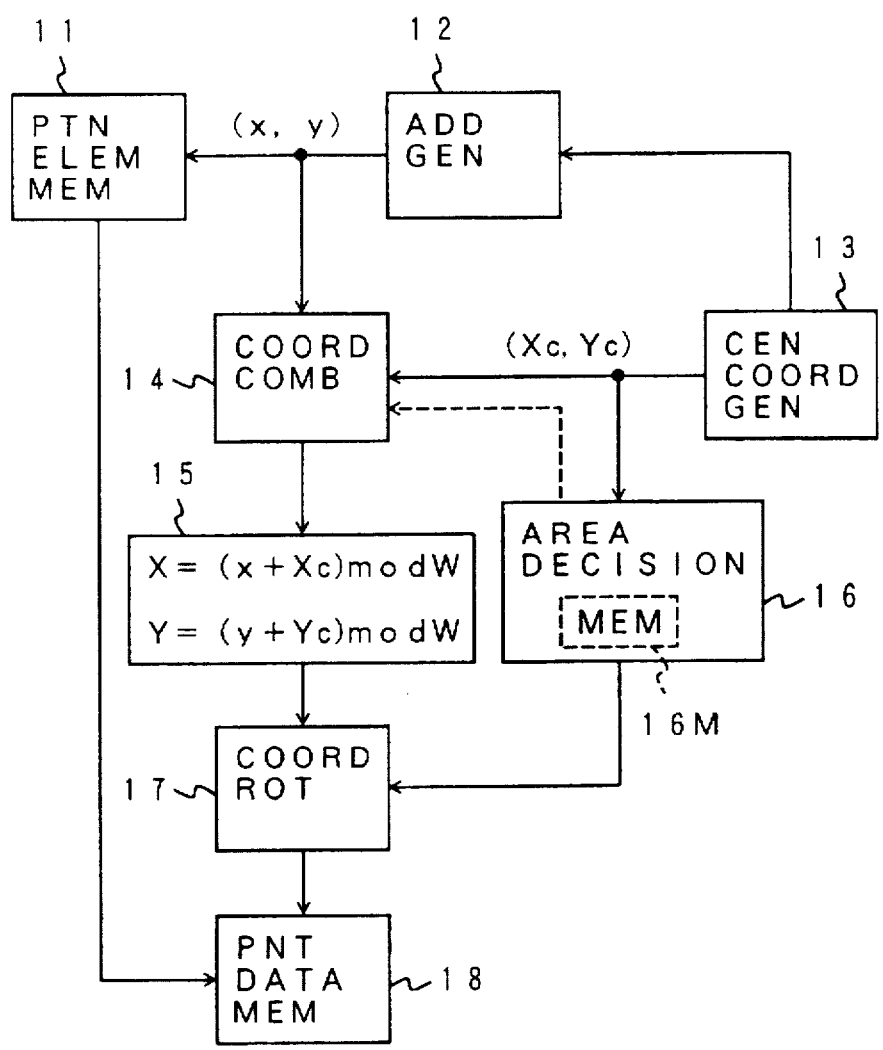
FIG. 5 is a block diagram illustrating an embodiment of the pattern generating apparatus according to the present invention.

In the above, with respect to that portion of the pattern element which protrudes from one side of the tile, the transformation part 15 in FIG. 5 has been described to perform the modulo operations to write the protruding portion by shifting the said one side to the opposed one in parallel; but, it is also possible to bring the protruding portion into the tile by shifting it through 90° rotation about one end of the side from which the pattern protrudes, as described previously with reference to FIG. 1B. In such an instance, for example, the circular arc portion $C_b$ projecting out from one side of the tile Ta in FIG. 6A is transformed to $C_{b3}$ in FIG. 6C when it is turned 90° to the left about the one end Ox of the side. Letting the coordinate of the pixel of the pattern projecting out from the tile Ta be represented by (X, Y), the coordinate of the projecting circular arc portion turned 90 degrees about the end Ox of the side is (W−Y, X−W).

Figure 7:
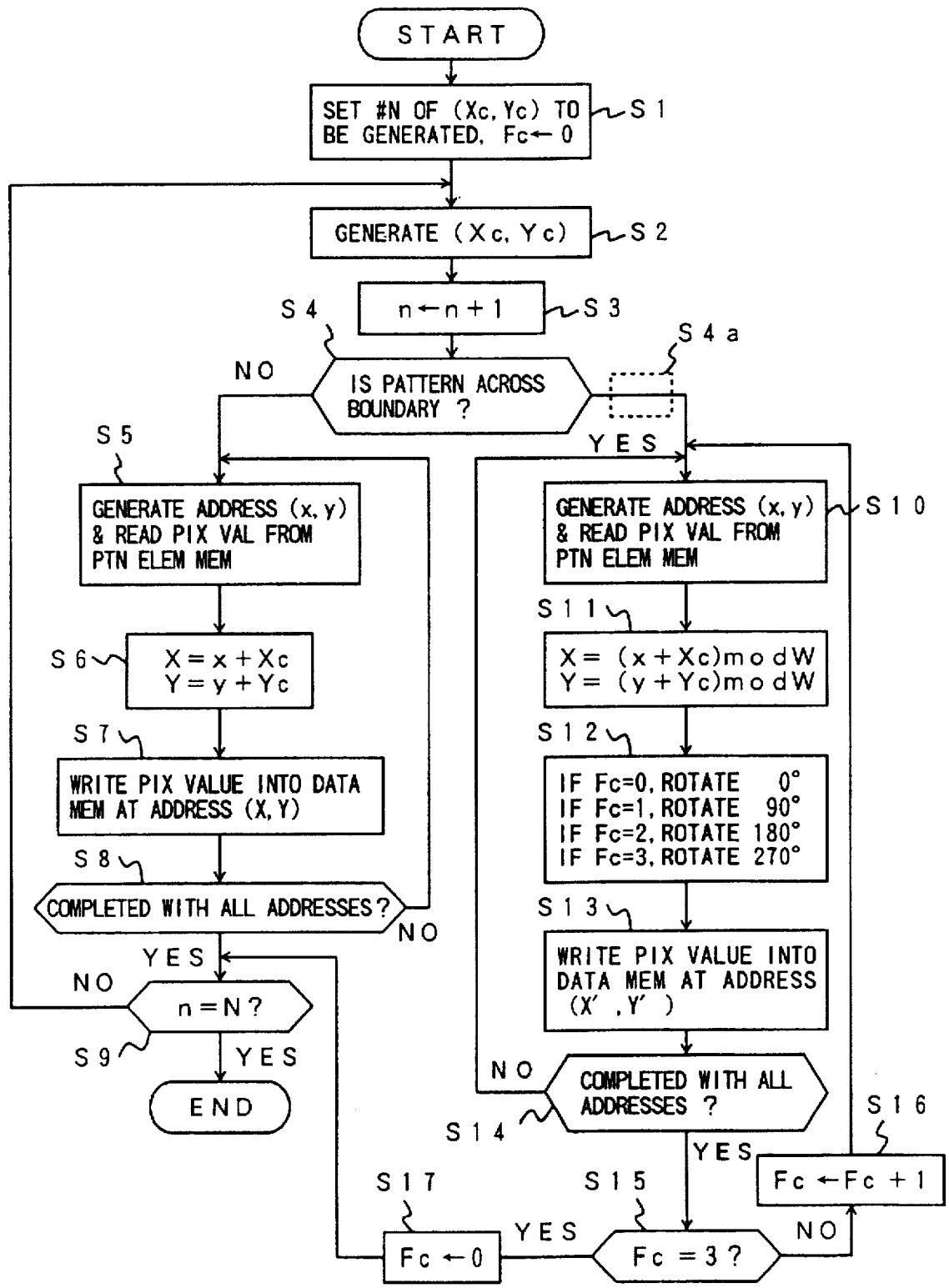
FIG. 7 is a flowchart showing a tile pattern generating procedure according to the FIG. 5 embodiment.

In FIG. 7 there is shown, in the form of a flowchart, a procedure of generating tile patterns by the device of FIG. 5. The procedure begins with step S1 of setting the total number of times N the center coordinate is generated and setting a rotation flag Fc to zero, followed by step S2 wherein the center coordinates (Xc, Yc) are generated randomly. In step S3 the current number of times n the center coordinate has been generated so far is incremented by one, and in step S4 a check is made to see if the pattern element crosses the boundary of the tile. If not, then the readout address (x, y) is generated which is used to read out the corresponding pixel value from the pattern element memory 11. In step S6 the address (x, y) and the center coordinate (Xc, Yc) are combined to provide coordinate X=x+Xc, Y=y+Yc, and in step S7 the pixel value read out in step S5 is written into the data memory 18, using the combined coordinate as the address therefor. In step S8 a check is made to determine if pixel values have been read out of all the addresses (x, y); if not, then steps S5, S6 and S7 are repeated again. When the readout from all the addresses has been completed, it is checked in step S9 whether the number of times n the center coordinate is generated has reached the preset value N; if not, then the procedure goes back to step S2, and if the value N has been reached, the procedure is finished.

When it is determined in step S4 that the pattern element cross the boundary, the procedure proceeds to step S10, wherein the readout address (x, y) is generated and is used to read out the corresponding pixel value, then in step S11 the address (x, y) and the center coordinate (Xc, Yc) are combined and a modulo-W residue operation of the combined address is conducted to obtain the coordinate (X, Y). In step S12, if the rotation flag Fc is 0, 1, 2 or 3, then the coordinate (X, Y) is rotated 0°, 90°, 180° or 270°, respectively, to obtain the coordinate (X', Y'), and in step S13 the pixel value read out in step S10 is written in the data memory 18, using the coordinate (X', Y') as the address therefor. In step S14 a check is made to see if pixel values have been read out of all the addresses (x, y); if not, the steps S10 through S13 are repeated again. If the readout from the all the addresses (x, y) has been completed, it is checked in step S15 whether the flag Fc has reached 3; if not, the flag Fc is incremented by one in step S16 and the procedure goes back to step S10. When it has been found in step S15 that the flag Fc has reached 3, the flag Fc is reset to zero in step S17, followed by step S9.

In the embodiment described above in respect of FIGS. 5, 6A, 6B and 6C, when the combined coordinate (X, Y) is rotated by the coordinate rotation part 17 through 0°, 90°, 180° and 270° to obtain addresses for writing into the pattern data memory 18, the pattern elements written into the memory 18 through the use of such write addresses have also been rotated 0°, 90°, 180° and 270°, respectively. To obtain the same results as mentioned above, it is also possible to employ a method according to which the center coordinate (Xc, Yc) is rotated 0°, 90°, 180° and 270°, respectively, then the address (x, y) to be combined with the rotated center coordinates is rotated 0°, 90°, 180° and 270°, respectively (that is, the patterns are rotated) and these rotated center coordinates and addresses are combined.

Figure 8:
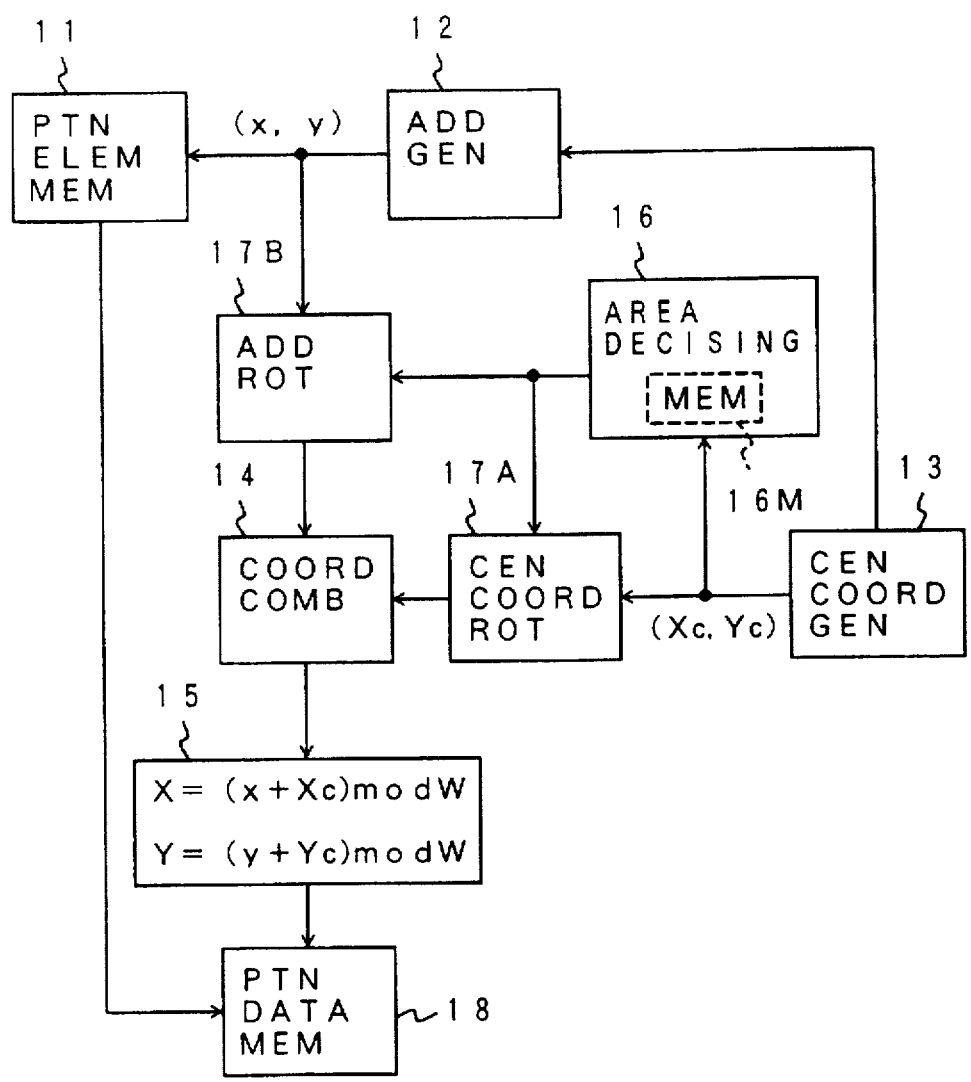
FIG. 8 is a block diagram illustrating a modified form of the FIG. 5 embodiment.
Figure 9:
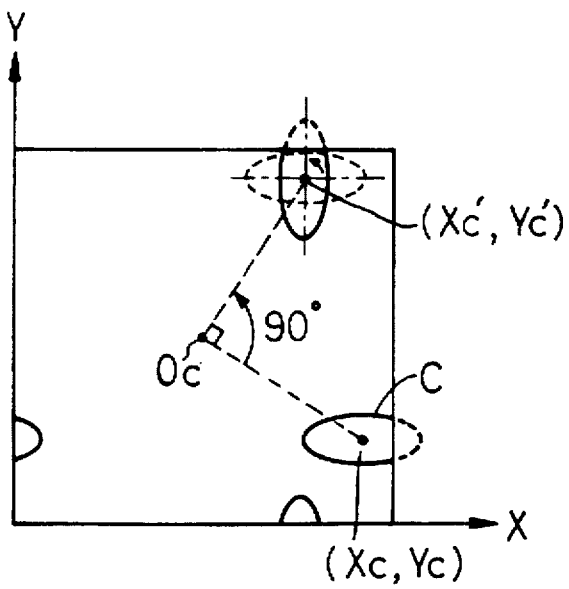
FIG. 9 is a diagram for explaining how to combine coordinates in the FIG. 7 embodiment.

For example, as shown in FIG. 8, the coordinate rotation part 17 in FIG. 5 is replaced with a center coordinate rotation part 17A for rotating the center coordinate and an address rotation part 17B for rotating the address (x, y). When it is decided by the area decision part 16 that the pattern element C to be written spreads across the boundary of the tile, its center coordinate (Xc, Yc) is rotated by the center coordinate rotation part 17A, for example, 90° about the center Oc of the tile for transformation into a coordinate (Xc', Yc') as shown in FIG. 9, then the address (x, y) to be combined with the rotated center coordinate is rotated 90° by the address rotation part 17B and the pattern element thus rotated 90° from the orientation indicated by the broken line in FIG. 9 is written in the memory 18 at the position centering about the rotated center coordinate (Xc', Yc'). The same applies to the other angles of rotation 0°, 180° and 270°.

Figure 10:
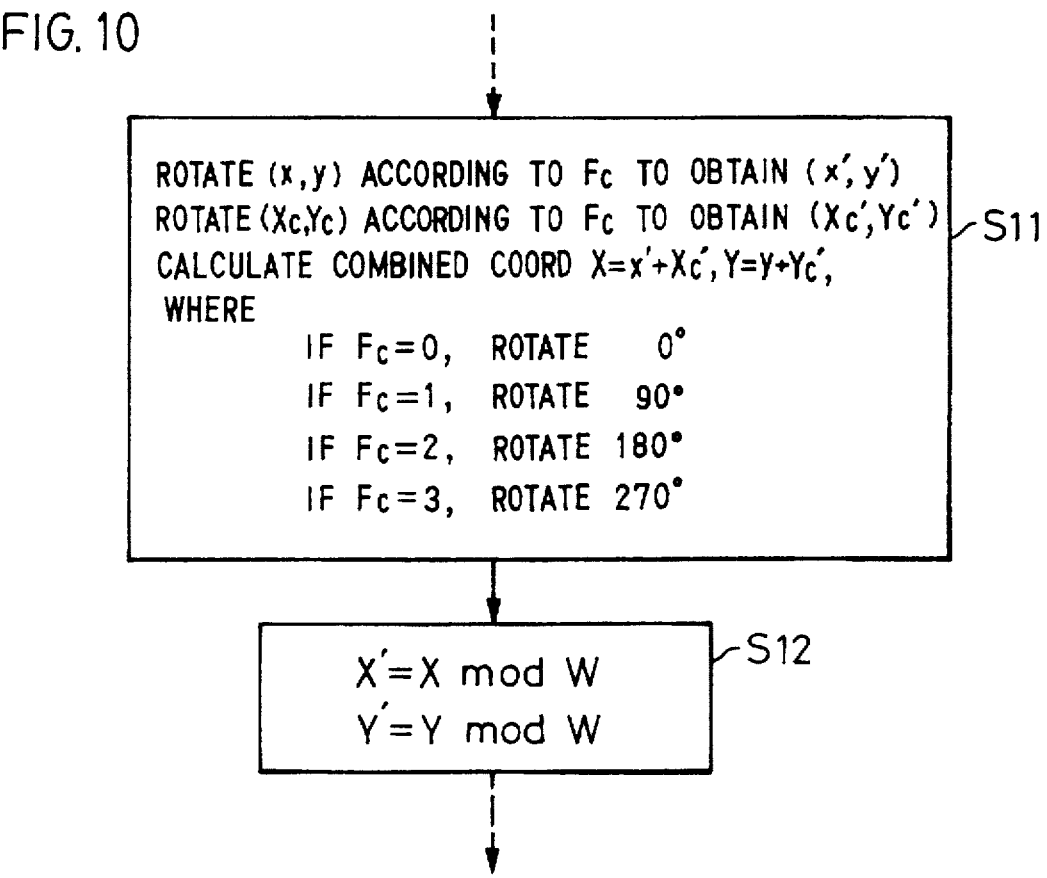
FIG. 10 is a flowchart showing the pattern generating procedure according to the FIG. 8 embodiment.

In the tile pattern generating procedure in this instance, steps S11 and S12 shown in FIG. 7 need only to be replaced with those shown in FIG. 10. That is, as depicted in FIG. 10, in step S11 the address (x, y) is rotated by an angle corresponding to the value of the flag Fc to obtain the address (x', y'), then the center coordinate (Xc, Yc) is also rotated by an angle corresponding to the value of the flag Fc to obtain the coordinate (Xc', Yc') and they are combined to obtain a combined coordinate X=x'+Xc', Y=y'+Yc'. In this case, when the flag Fc is 0, 1, 2 or 3, the angle of rotation is set to 0°, 90°, 280° or 270°, respectively. Next, in step S12 a modulo-W residue operation is performed for each of the combined coordinates X, Y to obtain residues X' and Y', which are used as the address (X, Y) in step S13 shown in FIG. 7.

Figure 11A:
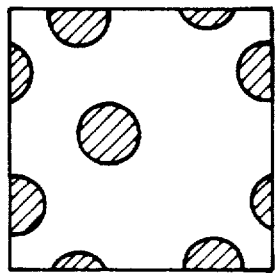
Fig. 11A is a diagram showing an example of a tile pattern which meets pattern continuation conditions, black circles indicating pattern elements.
Figure 11B:
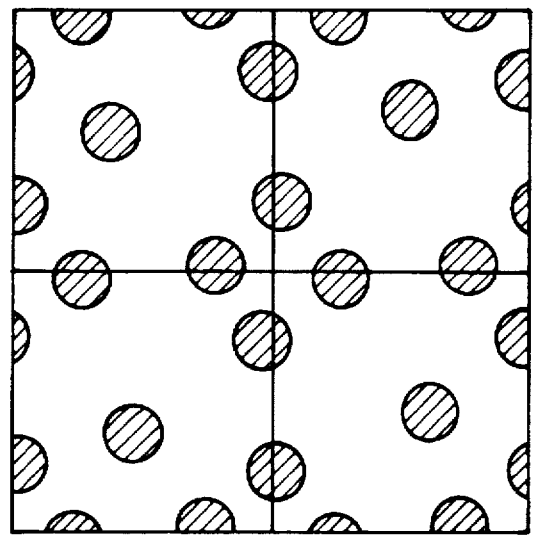
FIG. 11B is a diagram showing an example in which a plurality of tiles are arranged side by side.

FIG. 11A shows a tile pattern generated by repeatedly writing a black circle as a pattern elements in a square area (a tile area) through the use of the method described above with respect to FIG. 5 or 8. When tiles each having the illustrated patterns are arranged, the patterns continue across the boundaries of the tiles as shown in FIG. 11B.

Figure 12A:
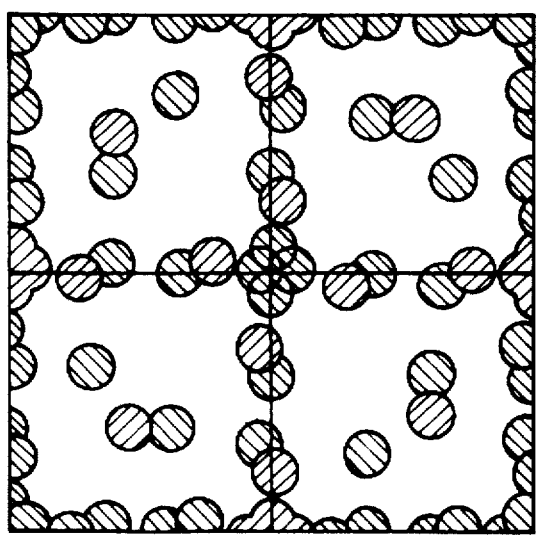
FIG. 12A is a diagram showing an example of a tile pattern in which the density of pattern elements is high in the boundary area.

Incidentally, according to the method described above in respect of FIGS. 5 and 8, when the black circle to be written crosses one side of one tile, three black circles need to be additionally written so as to ensure continuity of the pattern at the boundaries of the tile, and consequently, when the center coordinates of the black circles are randomly generated, the density of black circles increases along the boundaries of the tile. Hence, the more the number of black circles in FIG. 11A is increased, the more the block circles are concentrated near the boundaries of the tile arranged as shown in FIG. 12A, resulting in the tiles being fringed conspicuously with patterns.

The number of times the additional write is effected depends upon the condition how the tiles are joined together. For example, under the condition that patterns continue across the boundaries of the tiles when they are uniquely oriented, no additional write is needed, and hence no problem arises. Under the condition that the patterns continue across the boundaries of the tiles arranged in a 180° rotated orientation, one additional write is required, and under the conditions that the patterns continue across the boundaries of the tiles arranged in 90°, 180° and 270° rotated orientations, respectively, the required number of times the additional write is effected is three.

Figure 13A:
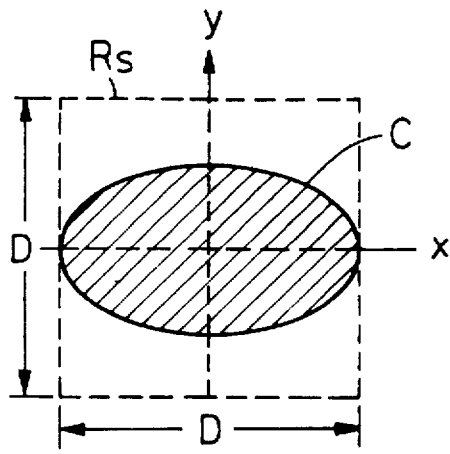
FIG. 13A is a diagram showing a pattern element and a stamp area including it.
Figure 13B:
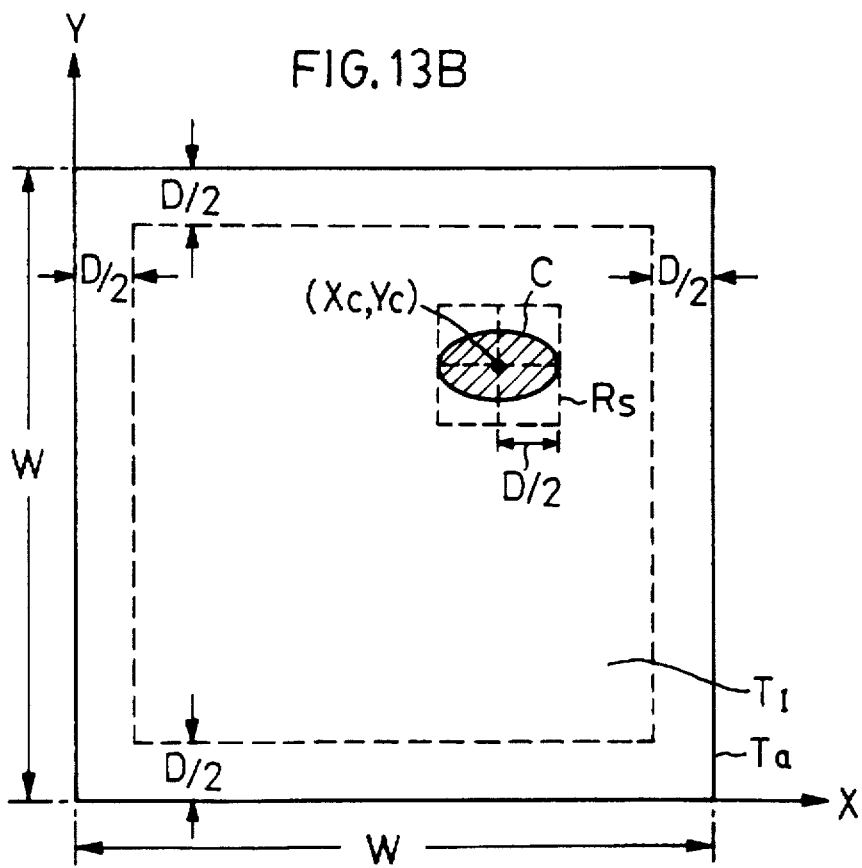
FIG. 13B is a diagram showing the relationship between the tile area and the stamp area where pattern elements are written.

Next, a description will be given of an improved tile pattern generating method in which additional patterns are also written in the inner area of the tile so that the write density in that area where patterns stay away from the boundaries of the tile may approach the write density in the boundary regions where patterns cross the boundaries of the tile. Since the pattern generating device embodying the improved scheme is identical in basic configuration with the device shown in FIG. 5 or 8, the method will be described with reference to FIG. 5. Suppose that there is prestored in the pattern element memory 11 a desired pattern element C, for example, an elliptic pattern element C which has a longer diameter D in the x-direction as shown in FIG. 13A. A square area $R_s$ which includes the pattern element (which area will hereinafter be referred to as a stamp area) is defined. As shown in FIG. 13B, a square tile of a width W is defined, and an inner area $R_I$ inwardly set D/2 back from each side of the tile and an outer boundary area $R_B$ are defined.

Thus, if its center coordinate (Xc, Yc) is in the inner area $R_I$, then the stamp area $R_s$ stays away from any sides of the tile, and consequently, the pattern element C stays inside the boundaries of the tile, but when the center coordinate (Xc, Yc) is in the boundary area $R_B$, the stamp area $R_S$ partly protrudes out the boundary. In the latter case, if the pattern element C is a circle inscribed in the square stamp area $R_s$, its part projects out of the boundary without fail, but in the case of using the element C which has different lengths in the X- and Y-axis directions as shown in FIG. 13A, even if the center coordinate (Xc, Yc) of the stamp area $R_s$ is on the boundary area $R_B$, the element C does not always protrude out of the tile. According to this embodiment, even in such a case, it is judged by the area decision part 16 that the center coordinate generated by the center coordinate generating part 13 is in the boundary area $R_B$ and as long as the stamp area $R_s$ protrudes out of the tile, processing is performed to satisfies the afore-mentioned pattern continuation condition at the boundary. That is to say, in the area transformation part 15, as is the case with FIG. 15, that part of the stamp area $R_s$ protruding out of the tile Ta and into the adjacent tile area and cut off at the boundary is brought onto the tile Ta by translating it by W, or by rotating it 90° about one end of the adjacent side, then pixel values in the separated stamp regions $R_s$ are written into the data memory 18 and pixel values in the separated stamp regions $R_s$ rotated 90°, 180° and 270° one after another are written into the data memory 18 upon each rotation.

Even if the stamp area $R_s$ partly protrudes out of the tile, the pattern element C is not cut off when it stays inside the boundary of the tile; hence, the pixel value of the element C at the position of the center coordinate (Xc, Yc) provided by the above-mentioned processing is written into the memory 18 and the pixel values of the element C at the positions where it was rotated 90°, 180° and 270°, respectively, about the center of the tile are additionally written into the memory 18. These additional writes have nothing to do with continuity of patterns across the boundaries of tiles but have no particular bad influence on the external appearance of the pattern. Besides, this scheme is advantageous in that the definition of the square including the pattern element permits unified processing. This embodiment differs from the FIG. 5 embodiment in that with respect to the additional write of the three elements into the boundary area $R_B$ by the above-mentioned rotation, at least one or more pattern elements C (three in this example) are additionally written so that the center coordinates (Xc, Yc) remain in the inner area $R_I$. To perform this, the center coordinate generating part 13 randomly generates the center coordinates (Xc, Yc) limited to the inner area $R_I$ after or before the additional writes into the boundary area or alternately with each other on the basis of the decision made by the area decision part 16 and patterns are additionally written in the inner area $R_I$.

Figure 14:
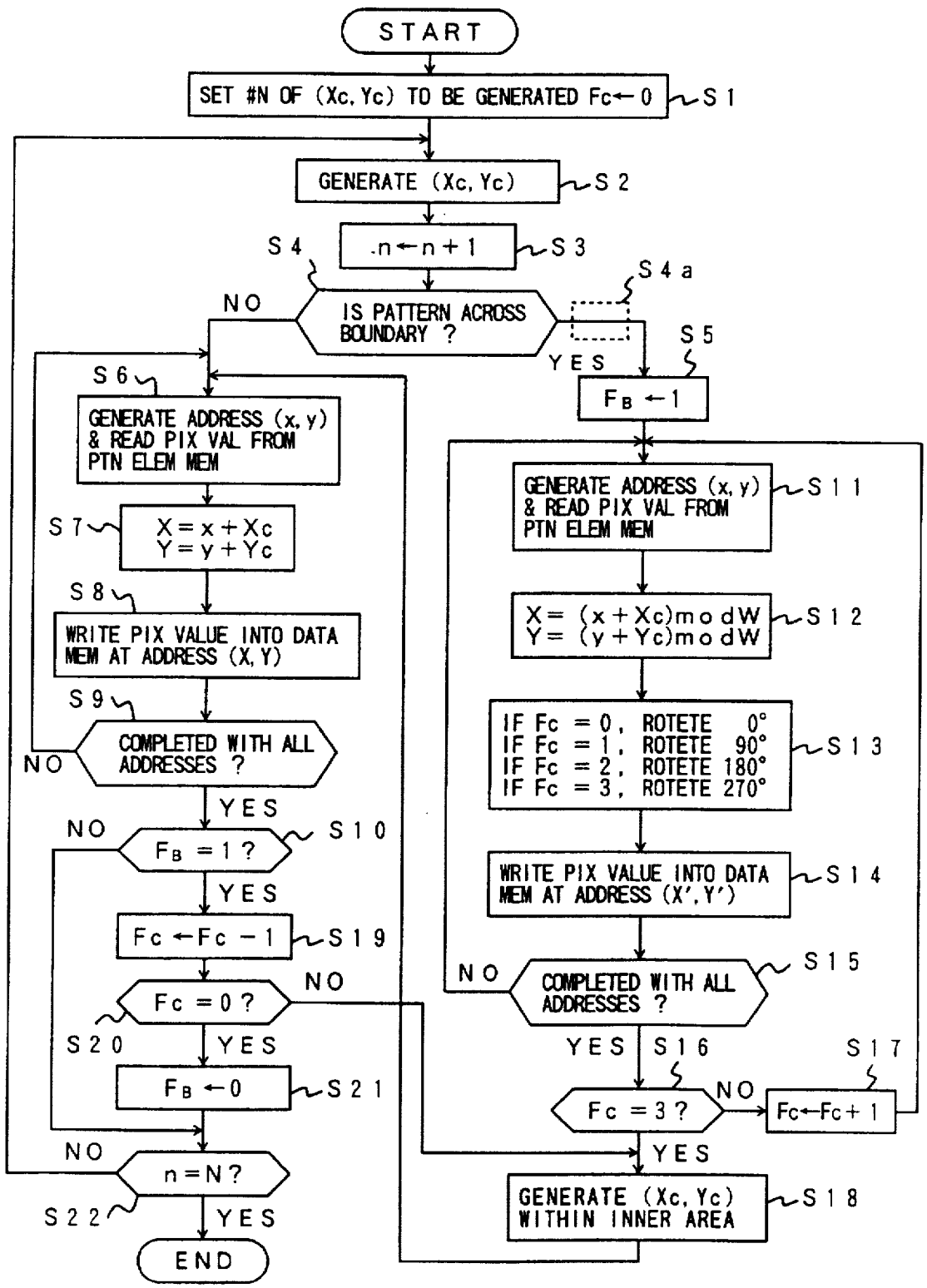
FIG. 14 is a flowchart showing a procedure of generating a pattern with a uniform density of pattern elements.

FIG. 14 is a flowchart of the above-described pattern generating method. In step S2 the number of center coordinates to be generated is set to N and a area flag $F_B$ and a coefficient flag $F_c$ are reset. In step S1 center coordinates (Xc, Yc) that satisfy conditions, W>Xc>0 and W>Yc>0, are randomly generated by the center coordinates generating part 13, then in step S3 the number of times n is incremented by one, and in step S4 check is made to see if each center coordinates (Xc, Yc) are in the inner area $R_I$ or in the boundary area $R_B$ in FIG. 13B; if it is in the boundary area $R_B$, it is judged that the stamp area $R_S$ spreads across the boundary, and the area flag $F_B$ is set. If the center coordinate (Xc, Yc) is in the inner area $R_I$, the readout address (x, y) is generated in step S6 and the corresponding pixel value is read out from the element memory 11. In step S7 the coordinate (X, Y) at which the pixel value is to be written is combined by the coordinate combining part 14 and in step S8 the pixel value is written into the pattern data memory 18. In the case where the pixel value is zero, however, no write is effected since the address (x, y) is not on the pattern element. In step S9 a check is made to see if readout addresses for the element memory 11 have all been generated, and steps S6 through S9 are repeated until all the addresses are generated, by which one pattern element is written in the inner area $R_I$. Next, it is checked in step S10 whether the area flag $F_B$ is up or not; if not, the procedure returns to step S2, in which the center coordinate (Xc, Yc) is generated again, then the number n is incremented by one in step S3, followed by step S4 wherein check is made to determine if the stamp area $R_s$ which includes the pattern to be written spreads across the boundary. When the stamp area $R_s$ crosses the boundary, the flag $F_B$ is set in step S5 and in step Sil the readout address (x, y) is generated and the pixel value is read out of the element memory 11. Since the flag $F_B$ is up, the stamp area $R_s$ to be written partly lies off the boundary of the tile; in step S12 the transformation part 15 transforms the combined coordinate (x+X, y+Yc) to a coordinate on the tile by shifting it by the length W of one side of the tile.

Next, it is detected in step S13 which of the values 0, 1, 2 and 3 the coefficient flag $F_C$ takes. If $F_c=0$, the transformed coordinate (X,Y) is set to X←X, Y←Y (0° rotation); if $F_c=1$, X←W−Y, Y←X (90° rotation); if $F_c=2$, X←W−X, Y←X (180° rotation); and if Fc=3, X←Y, Y←W−X (270° rotation). By any one of these transformations, the address (X, Y) is obtained. In step S14 this address is used to write in the data memory 18 the pixel value read out in step S11, and in step S14 it is checked whether the generation of all the addresses (x, y) of the memory 11 has been completed. Steps S11 through S15 are repeated until the generation of all the addresses is completed, and when the completion of the generation of the all addresses is detected in step S15, it is checked in step S16 whether $F_c=3$; if not, the value of the coefficient flag $F_c$ is incremented by one and steps S11 through S15 are performed again.

This is followed by step S18 wherein the center coordinates (Xc, Yc) are randomly generated in the inner area $R_I$ in FIG. 13B and steps S6 through S9 are repeated, by which pixel values read out of all the addresses are written into the data memory 18 in exactly the same way as described above. When it is detected in step S10 that $F_B=1$, the rotation flag $F_c$ is decremented by one; if the flag $F_c$ is not 0 in step S20, then the procedure returns to step S18 and steps S18, S6 to S10, S19 and S20 are repeated until the rotation flag $F_c$ goes to 0. By this, three pattern elements C are added to the inner area $R_I$. When it is detected in step S20 that $F_c=0$, the flag $F_B$ is each reset to zero in step S21, and it is checked in step S22 if the number of generation times n has reached N and if not the procedure goes back to step S2, repeating the above-described processing until the number reaches a desired number of times N.

Figure 12B:
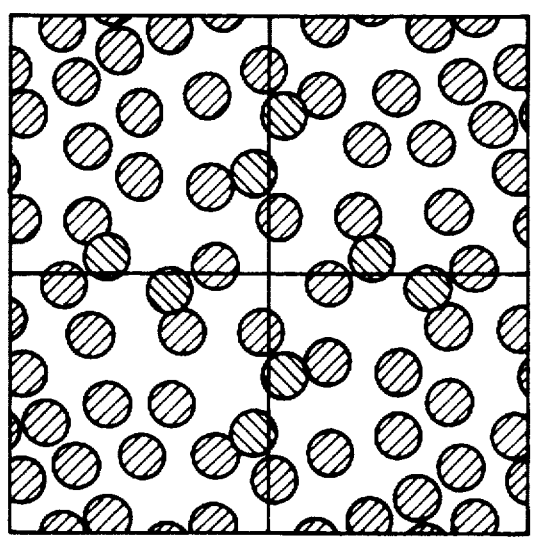
FIG. 12B is a diagram showing an example of a tile pattern generated by the procedure of FIG. 14.

While in the above the method of FIG. 14 has been described to be applied to writing an ellipse as the pattern element C, the method is also applicable to the writing of the black circles described previously with respect to FIGS. 11A, 11B and 12A, ensuring continuity of patterns across the boundaries of tiles as shown in FIG. 12B, for instance. Besides, the effect of concentrating the pattern elements in the boundary areas is lessened—this makes the individual tiles less noticeable. While the number of pattern elements that are added in the inner area $R_I$ has been described to be equal to the number of pattern elements added in the boundary area $R_B$, the former need not always be equal to the latter but may also be determined according to the latter. Moreover, the FIG. 14 embodiment has been described in connection with the case where square tiles are used and they each have patterns which are allowed to continue between any sides of the adjacent tiles, but in the case where patterns are allowed to continue only between corresponding sides or opposed ones of the adjacent tiles, only one pattern element having its coordinate rotated 180° needs only to be added; in this instance, only the 180° rotation of the coordinate takes place in step S13 and it is checked in step S16 whether $F_c=1$. Furthermore, since the number of pattern elements to be added in the inner area is one, steps S19 and S20 are omitted. In this case, the shape of the tile may be an arbitrary rectangle including a square.

Figure 15A:
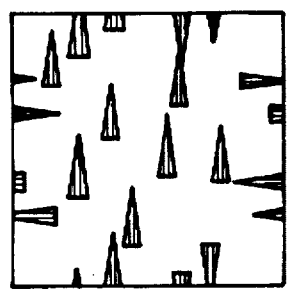
FIG. 15A is a diagram showing an example of an tile pattern written with pattern elements which have directionality.
Figure 15B:
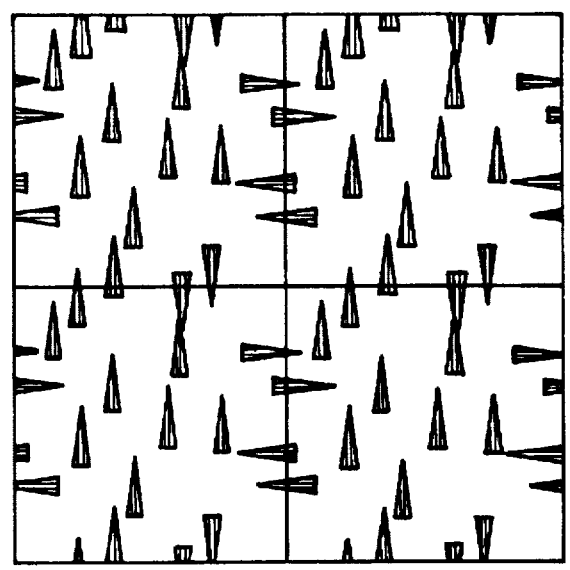
FIG. 15B is a diagram showing an example in which a plurality of tiles depicted in FIG. 15A are arranged.

In FIG. 15A there is shown an example of a tile pattern generated by writing wedge-shaped pattern elements having directionality in the tile area through the use of the method described previously with respect to FIG. 14. When a plurality of such tiles as depicted in FIG. 15A are arranged, the pattern elements are continuous with each other across the boundaries of the adjoining tiles as shown in FIG. 15B, but each tile is fringed with an unnatural pattern in the vicinity of its boundary because of the difference in the statistical distribution of the orientation of the pattern elements between the boundary area $R_B$ and the inner area $R_I$ of the tile.

The reason for this is that in the above-described embodiment, when the center coordinates (Xc, Yc) for writing pattern elements are in the inner area $R_I$ of the tile, the pattern elements are always written in a fixed orientation, whereas when the center coordinates are in the boundary area $R_B$, patterns rotated either 180° or 90°, 180° and 270°. To solve this problem, the pattern having center coordinates in the inner area $R_I$, too, need only to be rotated 0° and 180° in an alternate order or 90°, 180° and 270° in a sequential order in accordance with the pattern continuation condition used. A description will be given, with reference to FIGS. 16 and 17, of an embodiment based on such an idea.

Figure 16:
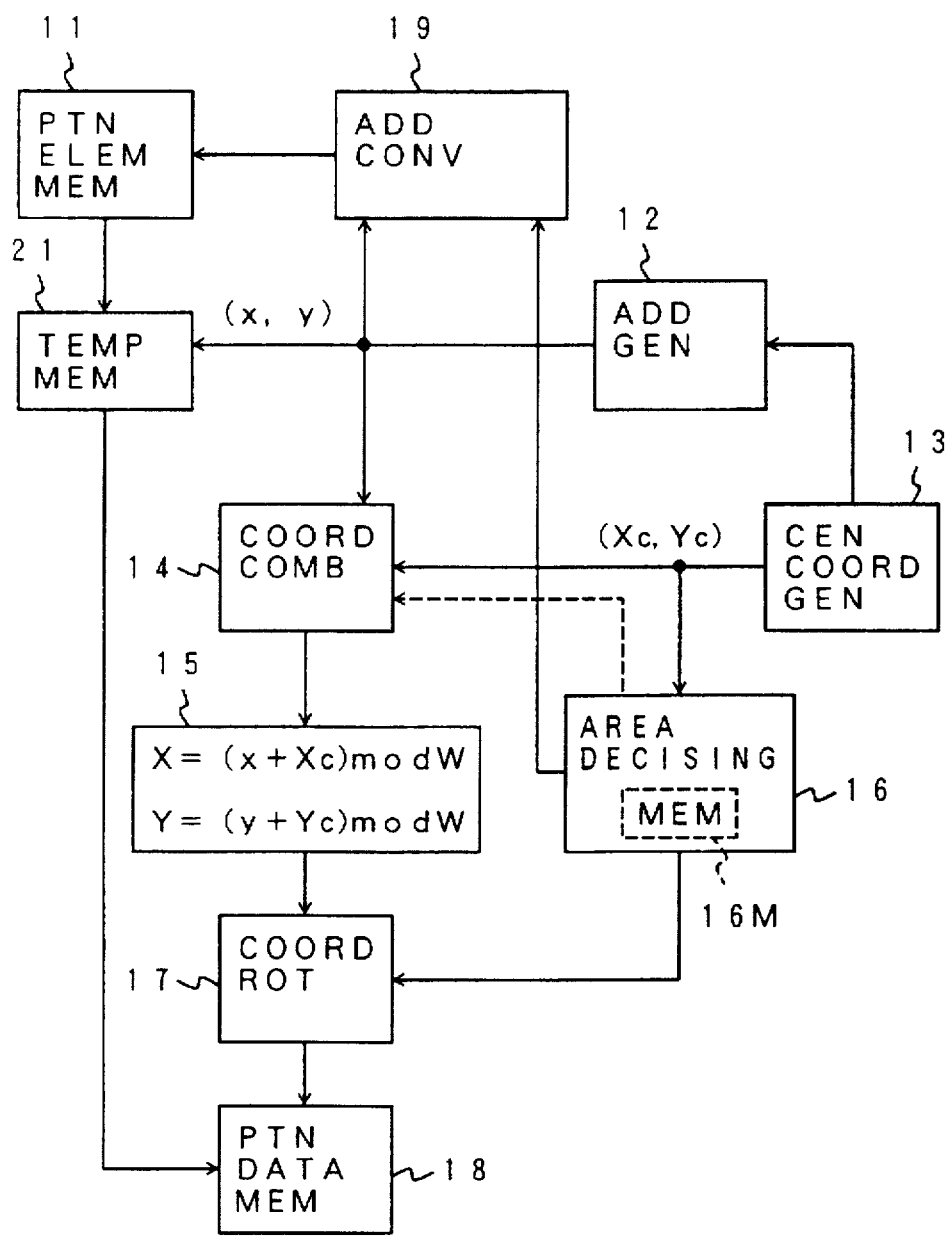
FIG. 16 is a block diagram illustrating a pattern generating apparatus which diversifies the direction or orientation of writing directional pattern elements.
Figure 17:
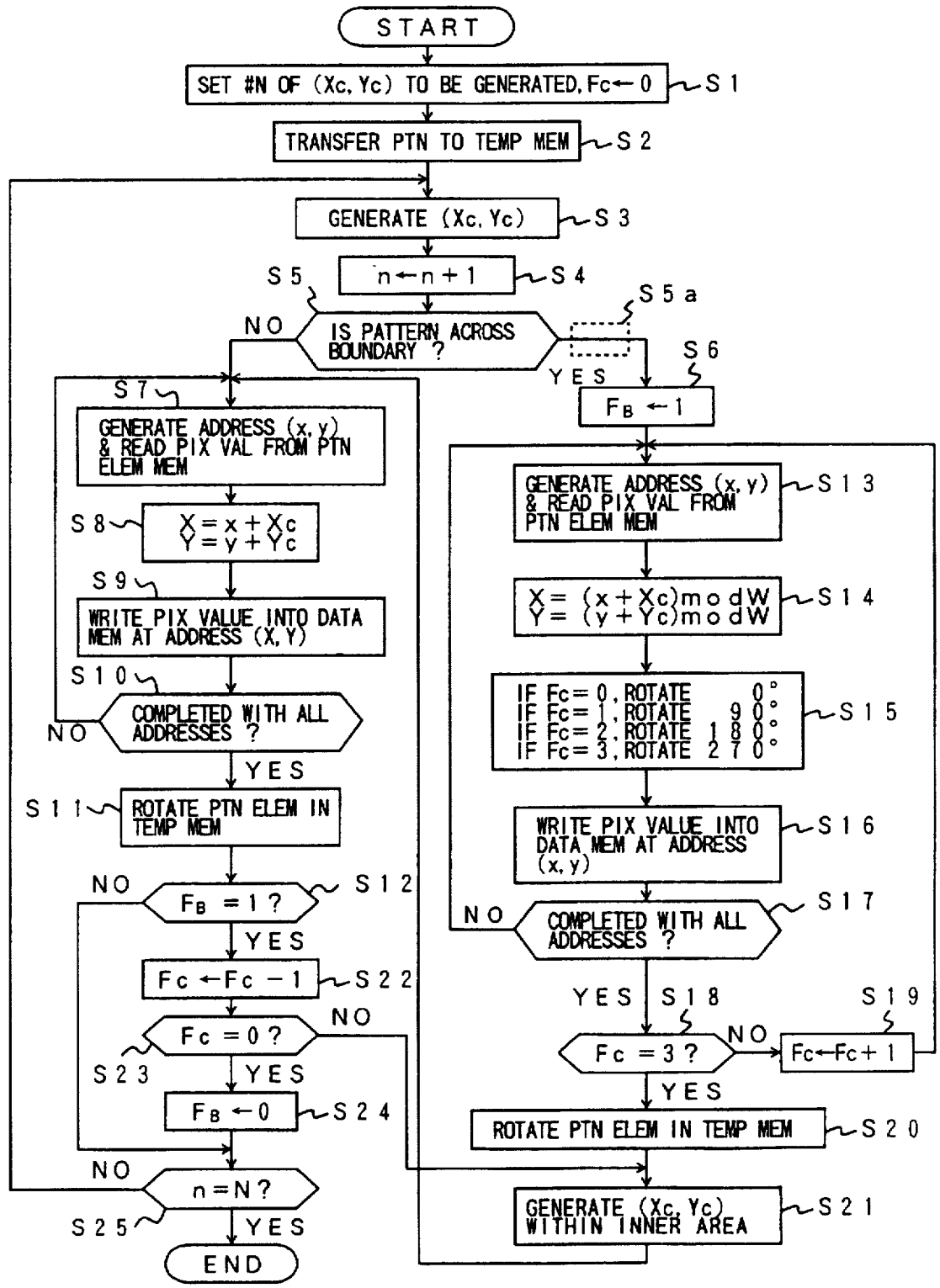
FIG. 17 is a flowchart showing a procedure of generating the tile pattern by the apparatus of FIG. 16.

The continuous pattern generating device of FIG. 16 is further provided with an address translation part 19 and a temporary memory 21 in the device configuration of FIG. 5. In this device, the pattern element read out of the pattern element memory 11 is not directly written into the pattern data memory 18 but instead it is written into the temporary memory 21 in a specified rotational orientation. And each time the pattern element is read out of the temporary memory 21 for writing in the inner area $R_I$ of the tile, the readout address is translated by the address translation part 19 to change the rotational orientation of the pattern element read out of the temporary memory 21. The tile pattern generation procedure shown in FIG. 17 is such one that is formed by adding only a step of transferring the pattern element to the temporary memory 21 after step S1 in FIG. 14 and a step of rotating the pattern element in the temporary memory 21 after each of steps S10 and S16 in FIG. 14.

More specifically, also in this embodiment, there is stored a predetermined pattern element in the pattern element memory 11 and the square stamp area including the pattern element is predefined. The address generating part 12 sequentially generates a sequence of addresses (x, y) of all pixels in the stamp area. At the start of operation, the address from the address generating part 12 is provided intact via the address translation part 19 to the element memory 11 to read it out and the pixel value of the thus read-out element is written in the temporary memory 21 at the corresponding address (step S2 in FIG. 17). The center coordinate generating part 13 randomly generates the center coordinates (Xc, Yc) in the tile area (step S3) as in the case of FIG. 13B, and the area decision part 16 makes a check to see if the stamp area lies across the boundary of the tile, depending upon whether the center coordinate is on the boundary area $R_B$ or inner area $R_I$ (step S5). If the stamp area does not lie across the boundary, the address generating part 12 generates the address (x, y), which is provided to the temporary memory 21 to read out therefrom the corresponding pixel value (step S7), while at the same time the address (x, y) is combined with the center coordinate (Xc, Yc) in the coordinate combining part 14 (step S8).

The combined coordinate (X, Y) is in the tile area (W×W), and hence is neither subjected to the area change in the coordinate transformation part 15 nor rotated in the coordinate rotation part 17 but is provided intact to the patter data memory 18 to write therein the pixel value read out of the temporary memory 21 (step S9). However, when the pixel value is zero, no write is effected. Upon completion of the above-described read and write for all the addresses of the stamp area (step S10), the address generating part 12 sequentially generates all addresses (x, y) for rewriting the temporary memory 21 and the address translation part 19 rotates the addresses (x, y) through 90° for translation into (−y, x) and provides them as readout addresses to the pattern element memory 11. The pixel values thus read out of the pattern element memory 11 are sequentially written at addresses (x, y) in the temporary memory 21 to write therein a 90°-rotated pattern element (step S11). Consequently, when a pattern element having its center coordinate in the inner area $R_I$ is to be written into the data memory 18 next, a 90°-rotated element is going to be written from the temporary memory 21, after which the pattern element in the element memory 11 is rotated 180° in step S11 in FIG. 17 and written into the temporary memory 21 to rewrite it. To this end, the address translation part 19 translates the address (x, y) to (−x, y). Further, after writing pattern element in the inner area $R_I$, the pattern element in the temporary memory 21 is rotated 270° for rewriting the temporary memory 21. The readout address (x, y) for the memory 11 at that time is translated to (y, −x). Thereafter, the temporary memory 21 is repeatedly rewritten with 0°-, 90°-, 180°- and 270°-rotated elements.

Figure 15C:
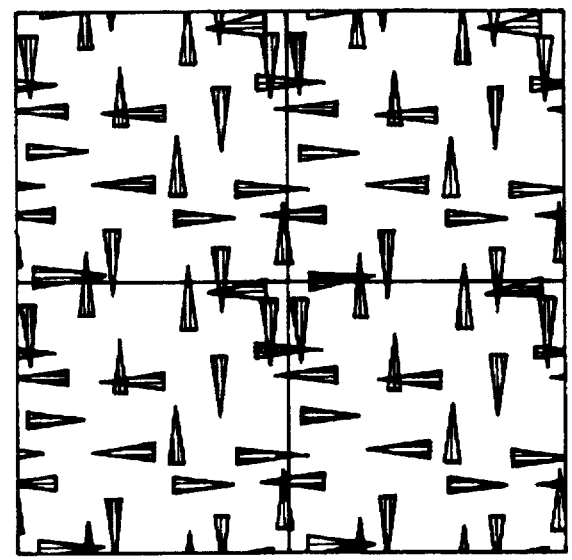
FIG. 15C is a diagram showing an example of the continuation of tile patterns generated by the procedure of FIG. 16.

When it is determined by the area decision part 16 that the center coordinate (Xc, Yc) is in the boundary area $R_B$, the flag $F_B$ is set to 1 (step S14), and as is the case with the FIG. 14 embodiment, that portion of the combined coordinate, X=x+Xc, Y=y+Tc, combined by the coordinate combining part 14 which lies off the tile is translated into the tile by a residue operation (step S14). After this, the combined coordinate is rotated 0°, 90°, 180° or 270° about the center of the tile, by which the pattern element is rotated 0°, 90°, 180° or 270° correspondingly, and the resulting pattern elements are written into the pattern data memory 118 (step S13 to S19). When the stamp area lies across the boundary of the tile, the pattern elements are each written after being rotated 0°, 90°, 180° and 270° in steps S13 to S19 so as to satisfy the pattern continuation condition as described above; on the other hand, also when the pattern having its center coordinate in the inner area $R_I$ is written in steps S7 to S11, the rotation angle of the pattern element is changed in order of 0°, 90°, 180° and 270° for each write. Hence, when a plurality of tiles are arranged as shown in FIG. 15C, for example, the orientations of the pattern elements written in the boundary and inner regions are distributed substantially uniformly over the all angles 0°, 90°, 180° and 270°.

While the embodiment shown in FIGS. 16 and 17 has been described in connection with the case of satisfying the pattern continuation condition regardless of how the square tiles are oriented, it can easily be understood it is also possible, in the case of rectangular tiles, to set conditions that patterns are allowed to continue only between each side of one tile and two opposed sides (0° and 180°) of other tiles which have the same length.

In the FIG. 5 embodiment, to produce plural kinds of tile patterns which meet the pattern continuation condition at the boundary, a coordinate memory 16M is provided in the area decision part 16 as indicated by the broken line, and in the first tile pattern generating process, a center coordinate storage step S4a is provided at the YES branch side of the decision step S4 as indicated by the broken line block in the flowchart of FIG. 7. In the first tile pattern generating process, each time it is judged by the area decision part 16 (step S4 in FIG. 7) that the center coordinate (Xc, Yc) randomly generated by the center coordinate generating part 16 in step S2, the center coordinate generating part 13 is caused to store the center coordinate (Xc, Yc) in the coordinate memory 16M (step S4a). When the first tile pattern generating process has ended with step S9, there are held in the coordinate memory 16M all the center coordinates (Xc, Yc) on the boundary area $R_B$ generated so far.

Figure 18:
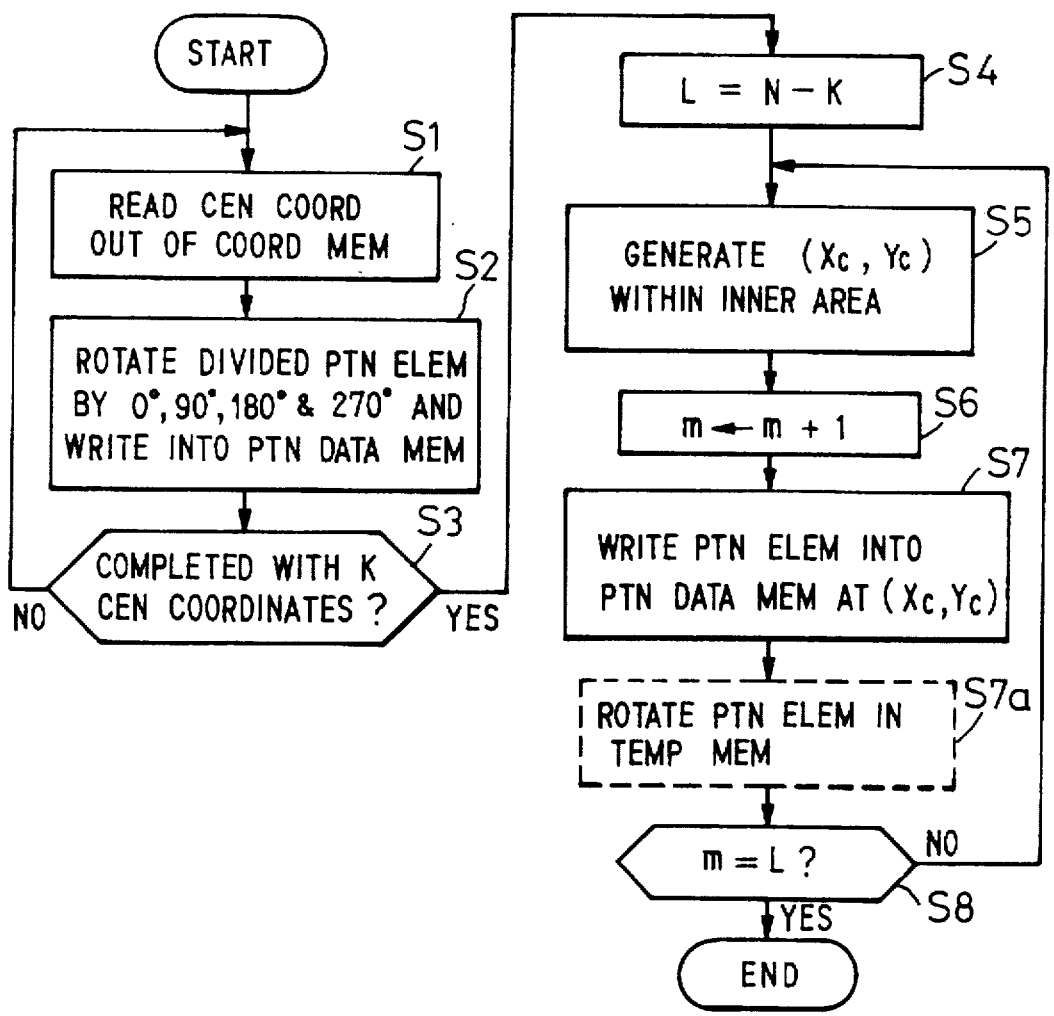
FIG. 18 is a flowchart showing a procedure of generating tiles of different patterns by satisfying pattern continuation conditions in the generation of a second pattern.

FIG. 18 is a flowchart for the generating second and subsequent tile patterns. In FIG. 18, step S2 merely indicates, by one block, the same processing as in steps S10 to S14 in FIG. 7 and, similarly, step S7 also indicates, by one block, the same processing as in steps S5 to S8 in FIG. 7. At first, in step S1 the center coordinate in the boundary area $R_B$ held in the coordinate memory 16M is read out. In step S2 the pattern element read out of the element memory 11 is disposed at the position of the center coordinate read out in step S1, then that portion of the pattern element which lies outside the boundary of the tile is shifted in parallel or translated by W in the coordinate transformation part 15, and the pattern element thus cut off is rotated 0°, 90°, 180° and 270°; the resulting patterns are written into the data memory 18. In step S3 a check is made to see if processing for all the center coordinates (supposed to be K) in the memory 16M has been completed; if not, the procedure returns to step S1, in which the next center coordinate is read out from the memory 16M, followed by the above-described processing in step S2. When it is determined in step S3 that the processing for the K center coordinates, the procedure proceeds to step S4 in which the number L of center coordinates in the inner area is calculated by subtracting the number K of the center coordinates in the boundary area from the total number N of center coordinates generated. Next, the center coordinates (Xc, Yc) within the range of the inner area $R_B$ are randomly generated in step S5, then the number m of times the center coordinate has been generated is incremented by one in step S6, and the pattern element read out of the element memory 11 is written in the data memory 18 at the position of the center coordinate (Xc, Yc) in step S7. In step S8 it is checked whether the number m of the center coordinates in the inner area $R_B$ has reached L; if not, the procedure goes back to step S5, repeating steps S6 and S7. When it is determined in step S8 that m=L, the procedure ends.

Also in the third and subsequent tile pattern generating processes, pattern elements are written similarly using the coordinates read out of the memory 16M as the center coordinates in the boundary area $R_B$ (steps S1 to S3) and the center coordinates in the inner area $R_I$ are randomly generated, by which pattern elements are generated (steps S4 to S8).

With the method described above with reference to FIG. 18, in the second or subsequent tile pattern generating process, the center coordinates in the boundary area $R_B$ generated during the first tile pattern generation are read out from the coordinate memory 16M and the cut-off pattern elements and patterns resulting from rotating them 90°, 180° and 270° are provided at the positions of the read-out center coordinates. Hence, the pattern continuation condition at the boundary is always satisfied; besides, since the pattern elements are written in the inner area $R_I$ at random positions, a different pattern can be formed for each tile.

In the case of applying the above-described scheme to the FIG. 14 embodiment, when it is judged in step S4 that the center coordinate is on the boundary area $R_B$ in the flowchart of the first tile pattern generation shown in FIG. 14, the center coordinate is stored in the memory 16M in step S4a indicated by the broken line. In the second and subsequent tile pattern generation, the pattern elements of the same number as those rotated and added in the boundary area $R_B$ in step S2 in FIG. 18 are additionally written in the inner area $R_I$ by setting L=N−K+3K=N+2K in step S3, with the result that the density of pattern elements in the inner area $R_I$ approaches that in the boundary area $R_B$. Also in the case of the embodiment described in respect of FIGS. 16 and 17, the coordinate memory 16M is similarly provided in the area decision part 16 and step S5a is provided at the YES branch side of the decision block S5 in the procedure of FIG. 17 as indicated by the broken line; in the first tile pattern generation, the center coordinate (Xc, Yc) generated on the boundary area $R_B$ is stored in the coordinate memory 16M as in the case of FIG. 14. In the second and subsequent tile pattern generation, L=N+2K is set in step S4 in FIG. 18 as in the FIG. 14 embodiment; furthermore, a step S7 is provided next to step S7 as indicated by the broken line, and as in step S11 in FIG. 17, the pattern element in the temporary memory 21 (FIG. 16) is rotated 90° each time the pattern element is written in the inner area $R_I$.

Usually the size of the pattern element is sufficiently smaller than the size of the tile in many cases, and consequently, the area of the boundary area $R_B$ is sufficiently larger than the area of the inner area $R_I$. Hence, in the embodiments of FIGS. 14 and 16–17 pattern elements of the same number as those rotated and added in the boundary area $R_B$ are added in the inner area $R_I$ at random positions so that the both regions have about the same density of pattern elements. With respect to the generation of different kinds of tile patterns common in the same pattern continuation condition at the boundary through the procedure of FIG. 18, it has been described to repeat the write processing S5 to S8 after setting, in step S4, the number L of writes in the inner area $R_I$ to $L=N+2K$ in accordance with the number 3K of additional writes in the boundary area $R_B$; but it is also possible to employ such a scheme as mentioned below.

Let the ares of the boundary and inner areas $R_B$ and $R_I$ mentioned previously in respect of FIG. 13B be represented by $S_B$ and $S_I$, respectively. Letting the number of center coordinates (Xc, Yc) generated in the boundary area $R_B$ by the first tile pattern generation be represented by K, the number of pattern elements written in the boundary area $R_B$ is 4K, including the number 3K of the pattern elements additionally written to meet the pattern continuation condition. Then letting the number of pattern elements to be written in the inner area $R_I$ be represented by L, the densities of elements in the boundary and inner areas $R_B$ and $R_I$ can be made equal by setting $4K/S_B=L/S_I$, and consequently, the number L of additional writes in the inner area can be determined by $L=4KS_I/S_B$. In this instance, L needs to be an integer, so that when the value of $4KS_I/S_B$ is not an integer, it is rendered into an integer by a predetermined rounding method such as omission or raising of fraction.

In the embodiments described above, the pattern element to be written in the data memory 18 has a closed area; in the case where all the pixels in that area have pixel values other than zero, if a pattern element is written partly overlapping a previously written pattern element, the overlapping portion is overwritten by the pattern element written last. Thus, in the case of generating patterns by the method of the respective embodiment described above, the situation arises where, according to the specified writing method, the commutative law does not hold between the pixel value to be written and the pixel value at the position where to write. Here, the commutative law holds when using a writing method according to which, letting the pixel value on the tile area prior to the writing, the pixel value of the pattern element to be written and the pixel value after being written be represented by A, B and C, respectively, C remains unchanged even if A and B are exchanged in order as in the case of an addition or averaging. What is meant by "the commutative law does not hold" is that C changes when A and B are exchanged in order—this corresponds to, for example, a last-in preferential write (what is called an overwrite).

Figure 19A:
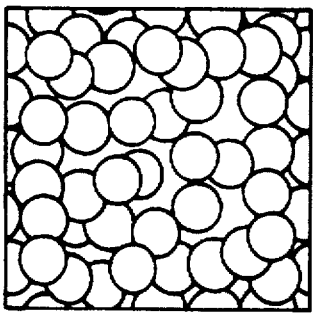
FIG. 19A is a diagram showing an example of a tile pattern generated by a writing scheme with which the commutative law does not hold.

In the case of generating a different tile pattern which satisfies the condition for continuation with the original tile pattern across the boundary of the tile, the method of FIG. 18 first writes all cut-off patterns on the boundary area $R_B$ on the basis of the center coordinate read out of the memory 16M (steps S1 to S3) and then writes pattern elements at random positions in the inner area $R_I$ (steps S4 to S8). In FIG. 19A there is shown an example of the tile pattern generated by the overwrite according to the method of the FIG. 18 embodiment. Because of the last-in preferential write, the pattern elements written in the inner area after the pattern elements were written in the boundary area at four rotated positions always overlap those written in the boundary area, resulting in an undesirable fringe pattern being generated in the vicinity of the boundary.

Such a problem could be solved by alternating the write of the pattern elements spreading across the boundaries and the write of the pattern elements staying inside the boundaries when the write method is specified which does not allow the commutative law to hold. For example, the pattern elements are alternately written while selecting the writing method so that the ratio between the number $N_B$ of pattern elements which extend across the boundaries and the number $N_I$ of pattern elements staying inside the boundaries may become the ratio between the area $S_B$ of the boundary area $R_B$ and the area $S_I$ of the inner area $R_I$, that is, so that the densities of pattern elements in the two areas may be equal.

Figure 20:
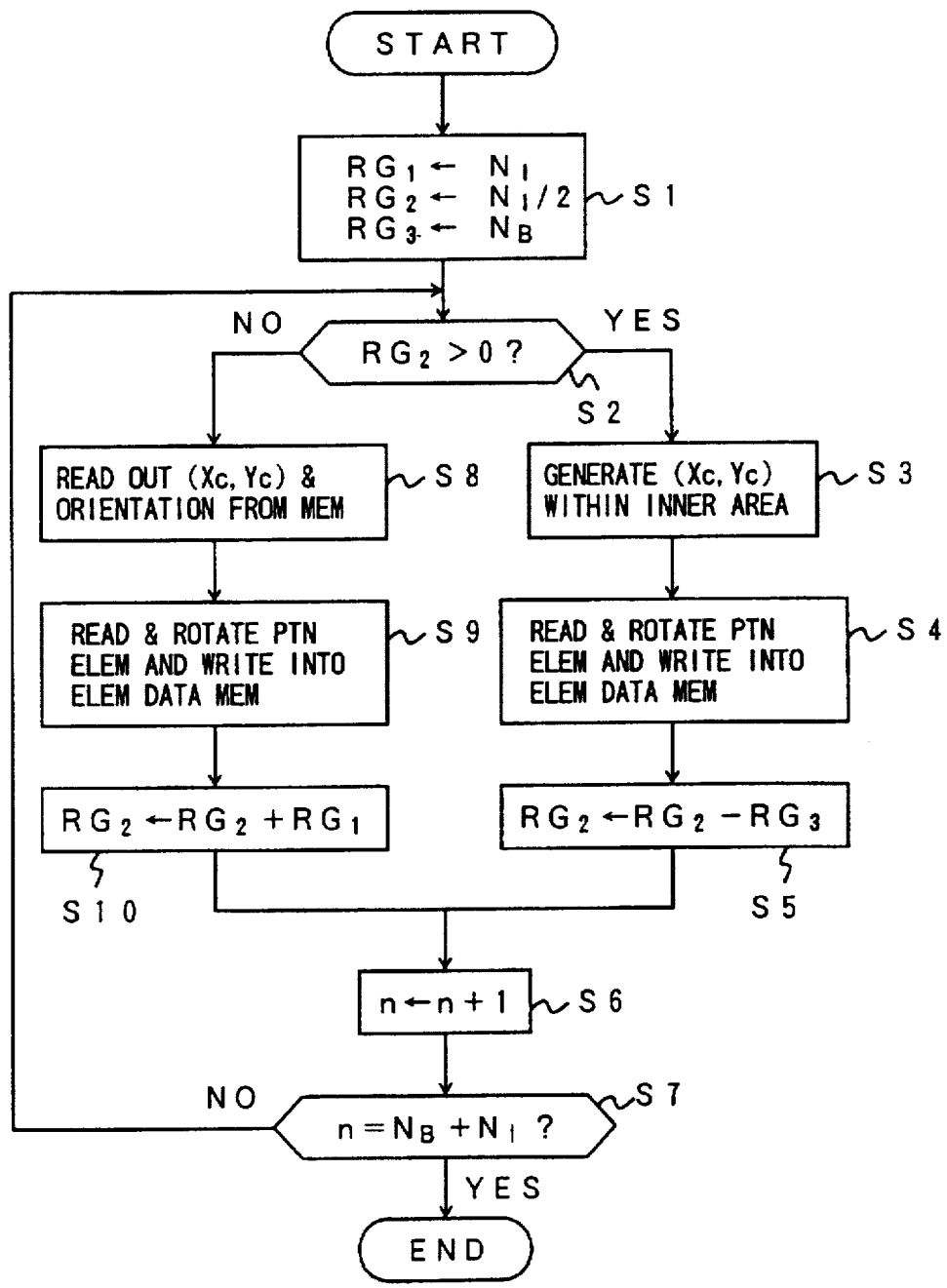
FIG. 20 is a flowchart showing a writing procedure using a DDA scheme in the case of $N_I > N_B$.
Figure 21:
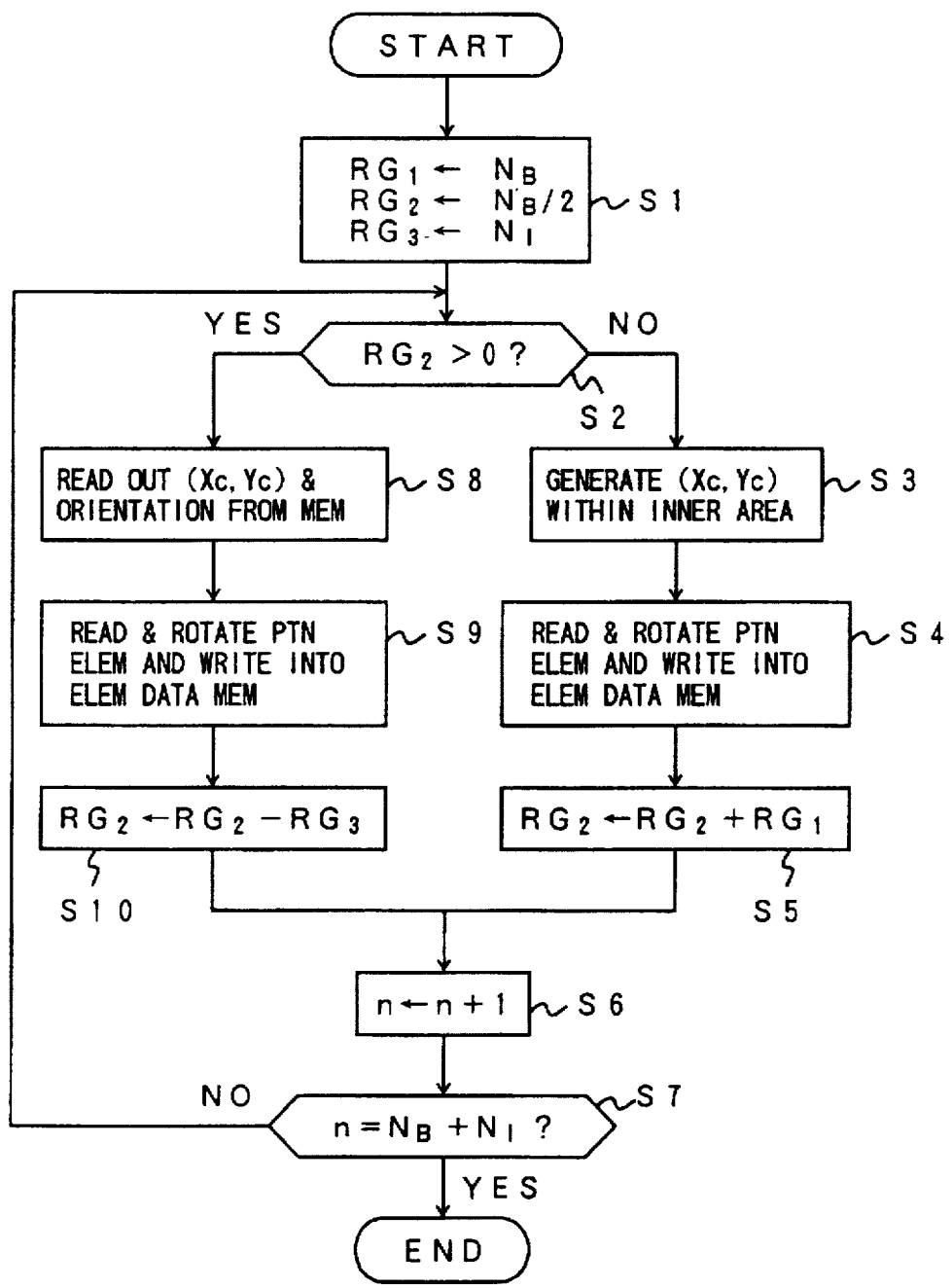
FIG. 21 is a flowchart showing a writing procedure using the DDA scheme in the case of $N_I \leq N_B$.

FIGS. 20 and 21 show second and subsequent procedures for generating tile patterns different from the original one on the basis of the above-described idea. Now, let it be assumed that, as the result of the first tile pattern generation by the device of the FIG. 16 embodiment, for instance, there are stored in the coordinate memory 16M the coordinates of the centers of rotation of all pattern elements written at the positions of rotation (including the 0° rotation, too) in the boundary area $R_B$ and the orientations of these written pattern elements. Let the number of center coordinates in the boundary area $R_B$ detected by the area decision part 16 be represented by $C_B$, the total number of pattern elements to be written in the boundary area $R_B$ including the number of pattern elements to be additionally written at the positions of rotation under the pattern continuation condition at the boundary be represented by $N_B=4C_B$ and the total number of elements to be written in the inner area $R_I$ be represented by $N_I$. Furthermore, let the areas of the boundary and inner areas $R_B$ and $R_I$ be represented by $S_B$ and $S_I$, respectively. To make the densities of pattern elements in the boundary and inner areas substantially equal to each other, the number $N_I$ of pattern elements to be written in the inner area $R_I$ is determined so that the condition $N_B/S_B=N_I/S_I$ essentially holds. That is, $N_I=N_BS_I/S_B$. Hence, this embodiment utilizes, for example, a well-known DDA (Differential Digital Analysis) scheme to determine, for each write, which of the boundary area $R_B$ and the inner area $R_I$ the pattern element is written in, and writes the pattern element in the area thus determined. By repeating this, the ratio of the number of times the pattern element is written between the both areas is controlled to be $N_B:N_I$.

FIG. 20 shows a procedure based on the above idea in the case of $N_I>N_B$. The procedure begins with step S1 wherein the values $N_I$, $N_I/2$ and $N_B$ are initialized to variables $RG_1$, $RG_2$ and $RG_3$, respectively. In step S2 a check is made to see if $RG_2>0$; if so, a center coordinate (Xc, Yc) is generated randomly in the inner area $R_I$ in step S3, and in step S4 a pattern element is read out of the element memory 11 and written at the position (Xc, Yc) in the data memory 18 in the same manner as in steps S6 to S9 of the flowchart shown in FIG. 14. In step S5 a subtraction, $RG_2-RG_3$, is carried out and its value is used as an updated value of the variable $RG_2$. In step S6 the number n of times the processing is executed is incremented by one, and in step S7 a check is made to determine if the number n has reached the total number $N_B+N_I$ of pattern elements to be written in the tile area; if not, the procedure goes back to step S2. When it is judged in step S2 that $RG_2>0$ does not hold, the procedure proceeds to step S8, wherein one of the center coordinates and the corresponding rotational orientation are read out from the memory 16M in the order of storage. This is followed by step S9, wherein, as in steps S11 to S15 in the flowchart of FIG. 14, the pattern element is rotated in the specified orientation, then the read-out center coordinate (Xc, Yc) is rotated about the center of the tile through an angle specified by the read-out orientation and the rotated pattern element is written at the position of the rotated center coordinate (Xc, Yc). Next, in step S10 a calculation, $RG_2+RG_1$, is performed and the calculated value is used to update the variable $RG_2$. In step S6 the number n of times the processing has been performed is incremented by one, and it is judged in step S7 that the number n has reached the total number of pattern elements to be written, the procedure is finished. By the processing of FIG. 20, the writes of the pattern elements in the boundary and inner areas are alternately effected with a probability of $N_B$ to $N_I$.

Also in the case where $N_B \geq N_I$, the procedure is basically the same as described above with reference to FIG. 20 except in the points described below. As shown in FIG. 21, in step S1 the values $N_B$, $N_B/2$ and $N_I$ are initialized to the variables $RG_1$, $RG_2$ and $RG_3$, respectively; when it is decided in step S2 that $RG_2>0$ holds, the write in the boundary area is effected in steps S8 and S9; in step S10 the variable $RG_2$ is updated with the value obtained by the subtraction $RG_2-RG_3$; when the decision in step S2 is NO, the write in the inner area is effected in steps S3 and S4; and the variable $RG_2$ is updated with the value obtained by the calculation $RG_2+RG_1$.

The embodiments of FIGS. 20 and 21 have been described above to employ the DDA scheme to effect the write in the boundary and inner areas alternately with such a ratio that the densities of pattern elements written in the both areas become about the same. For example, in the case where $N_B<N_I$, however, it is also possible to use a method by which the write is effected first in the inner area $(N_I-N_B)$ times in succession and then alternate writing of one pattern element in the both areas is effected $N_B$ times. When $N_B>N_I$, the write is carried out first in the boundary area $(N_B-N_I)$ times in succession and then alternate writing of one element in the both areas is repeated $N_I$ times. When $N_B=N_I$, alternate writing of one element in the both areas needs only to be repeated $N_B$ times.

Figure 19B:
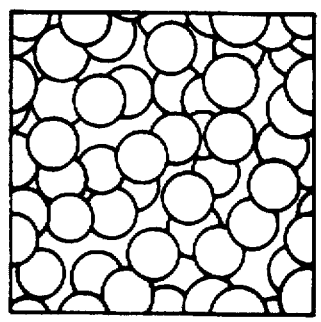
FIG. 19B is a diagram showing an example of a tile pattern generated by pattern elements in the boundary and inner areas alternately with each other.

FIG. 19B shows an example of a second tile pattern produced by the method of the FIG. 20 embodiment on the basis of the original tile pattern generated first. It is seen from FIG. 19B that such undesirable fringe patterns as shown in FIG. 19A are not produced near the boundaries of the tile, since the pattern elements are written in the inner and boundary areas alternately with each other.

While in the above the embodiments have been described to generate a pattern using only one kind of pattern elements, it is needless to say that a pattern composed of two or more kinds of pattern elements can be generated by applying the methods of the above-described embodiments individually to the respective kinds of elements.

Moreover, although the embodiments have been described to generate a square or rectangular area (a tile area) through the use of two-dimensional pattern elements, it goes without saying that a cubic pattern, which is formed by stacking cubic or rectangular parallelepipedic bricks and has cubic pattern elements contiguous with each other at the interfaces between the bricks, that is, a solid texture that is used in the field of computer graphics, can easily be generated simply by extending the two-dimensional pattern elements to three-dimensional ones, rendering the square stamp area including the pattern elements into a cubic stamp space, rendering the square or rectangular tile area into a cubic space (a brick space, for example) and extending the calculation of the (X, Y) coordinate to the calculation of an (X,Y,Z) coordinate.

By the way, to print a pattern on a square area is important for enhancement of the value of a tile, carpet or similar industrial products. According to the methods of the above-described embodiments which satisfy the pattern continuation conditions at the boundary, a predetermined pattern element is repeatedly written in the tile area. Accordingly, the pattern formed in the tile area by such methods is basically a mere repetition of a predetermined pattern element, and hence is unsatisfactory in terms of variety. If a fractal scheme could be used in the generation of the tile pattern which meets the pattern continuation conditions at the boundary, the variety of the pattern could be further increased.

The fractal scheme, which is one of pattern generating methods, is a potential pattern generating method that permits the generation of complicated and natural patterns; this method has recently attracted increasing attention on the ground that it allows ease in the generation of a 1/f fluctuation pattern whose spatial frequency is attenuated at a rate of −6 dB/Oct (James D. Foley et al., Computer Graphics, ISBN 0-201-12110-7, for instance). According to the fractal method, the pixel value of each apex of a regular triangle is set to a proper value in an area defined by the regular triangle or a set of such regular triangles and a value, obtained by adding a noise amount to the average of pixel values of opposite ends (i.e., two apexes) of each side of each regular triangle, is provided as the pixel value at the midpoint of each side, by which the regular triangular area is divided into four regular triangular areas; the four regular triangular areas are subdivided into 16 regular triangular areas by repeating the above-mentioned processing for each of the four areas. Thereafter, this processing is repeated until values are written in all pixels in the original regular triangular area, by which a fractal pattern is produced in the area defined by original regular triangular area and its set.

With the existing fractal generating techniques, however, pattern can be formed only in areas defined by regular triangles and their sets as referred to above. In the case of generating a fractal pattern in a rectangular area, it is customary in the prior art to generate a fractal pattern in a large area defined by a regular triangle including a rectangular area or its set and cut out the rectangular area after the generation of the fractal pattern. Since this method requires a memory having a work area large in area than the pattern desired to generate, however, the storage capacity and operation time by the computer used increase unnecessarily. This poses a particularly serious problem in the generation of high-definition patterns. There has been proposed a method which devises coordinate calculations for drawing patterns which continue across boundaries between rectangular areas arranged side by side, but in the implementation of this invention method, the pattern needs to be generated for each rectangular area; hence, the application of the conventional fractal pattern generating method is difficult. Now, consider the generation of a fractal pattern in a square area by such a method as described below.

Figure 22A:
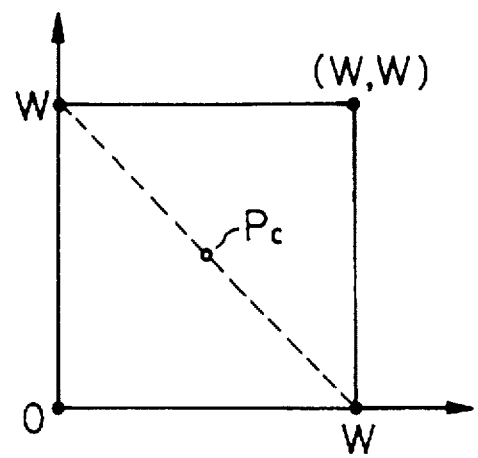
FIG. 22A is diagram for explaining a first procedure for the fractal generation according to the present invention.

At first, as shown in FIG. 22A, the coordinates of four apexes of an original square area are set to proper values. Then, the pixel value Vc of the center point Pc of the four apexes of the original square area are calculated. In this case, if the definition of the conventional method of generating fractals in triangular areas is simply extended, it will be a general rule to obtain the pixel value Vc of the center point Pc by calculating the average value of the pixel values of the four apexes and then adding the amount of noise to the average value. With this method, however, small but sharp bright and dark spots appear in the pixel value distribution of a fractal pattern generated under such a condition that the amount of noise abruptly decreases with the number of times the dividing process is performed. As a result, when a color pattern is generated by mapping colors in accordance with the pixel values, the bright or dark spots remain as dots of colors remarkably different from the surrounding colors, seriously impairing the texture of the pattern.

To avoid this problem, according to the present invention, either one of two pairs of diagonally opposite apexes of the square area is selected and a value obtained by adding the amount of noise to the average of pixel values of the two apexes of the selected pair is used as the pixel value Vc of the center point Pc. SInce this method is equivalent to the method of obtaining the midpoint of an oblique side of a rectangular equilateral triangle as shown in FIG. 22A, the fractal pattern by this method has a texture extremely close to that obtainable with the traditional fractal method which repeatedly divides regular triangles; furthermore, such a fractal pattern is free from markedly bright or dark spots.

Figure 22B:
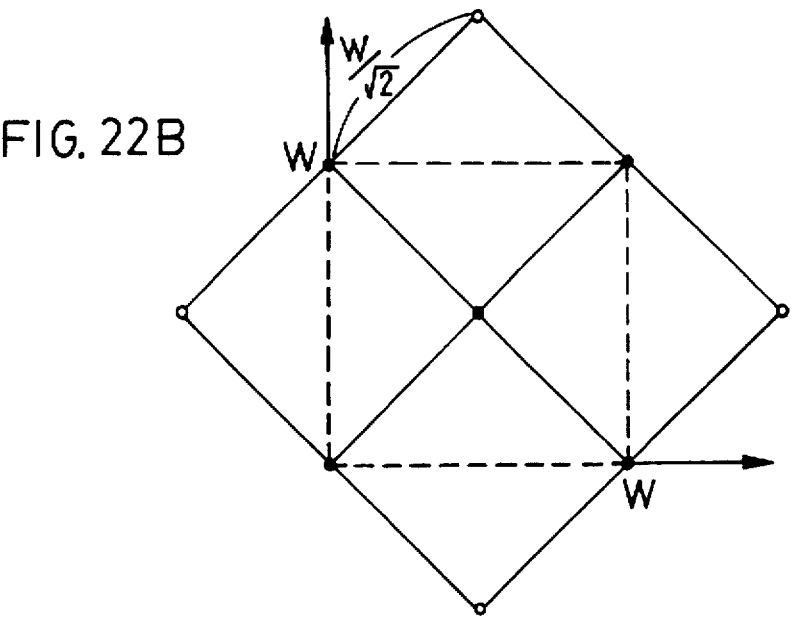
FIG. 22B is a diagram for explaining a second procedure for the fractal generation according to the present invention.

After the calculation of the pixel value Vc of the center point Pc, four square areas are defined each of which has one side of the immediately preceding original square as its diagonal, uses the center point Pc as an apex common to the other squares and has each side of a length $W/2^{1/2}$, as shown in FIG. 22B. These four small squares whose diagonals are inclined 45° toward the diagonal of the original square will hereinafter be referred to as rhombic areas. Next, either one of two pairs of diagonally opposite apexes is selected in each rhombic area and a value obtaining by adding the amount of noise to the average of the pixel values at the two apexes of the selected pair is used as the pixel value at the center of the rhombic area. Let it be assumed, in this case, however, that in the rhombic areas which have apexes outside the original square area as indicated by white circles, a pair of diagonally opposite apexes inside the original square area is always selected and that the pixel value at the center point of the rhombic area is calculated by adding the amount of noise to the average of the pixel values at the two apexes of the selected pair. That is, when the one diagonal of the rhombic area crosses one side of the original square area, the other diagonal is selected.

Figure 22C:
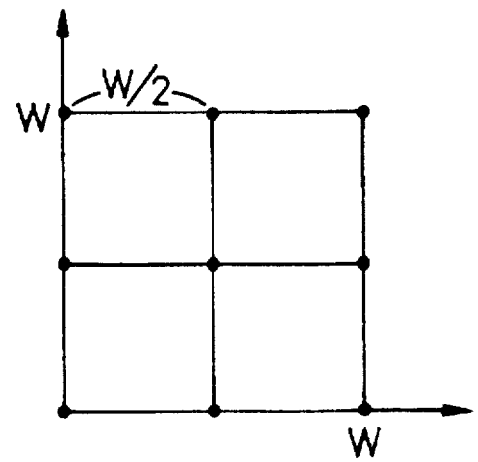
FIG. 22C is a diagram for explaining a third procedure for the fractal generation according to the present invention.

By dividing the rhombic areas with the above-mentioned method, a set of square areas having each side of a length W/2 as shown in FIG. 22C. This is equal to a set of four square areas obtained by dividing thereinto the original square area of FIG. 22A. That is to say, by performing the two procedures of dividing the square area into rhombic areas and then dividing them into square areas, the original square area is transformed into a set of four divided square areas. Then, the two procedures are alternately performed until the length of one side of each of the thus divided square areas reaches the length corresponding to the pitch of pixels. As a result, a write is effected in every pixel in the square area, finishing the generation of a fractal pattern. With this method, it is possible to generate a fractal pattern in a square area of a square of a given size.

Figure 23:
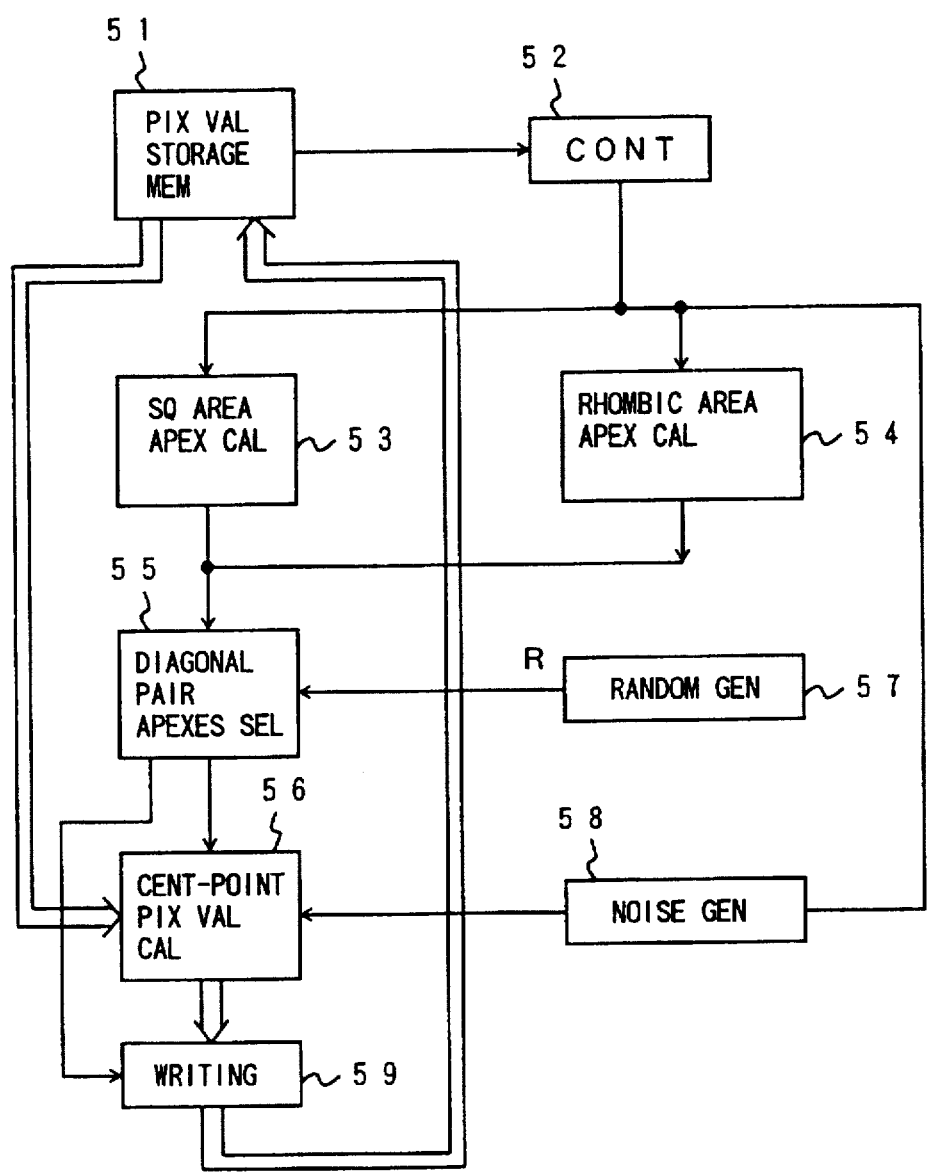
FIG. 23 is a block diagram illustrating the fractal pattern generating apparatus according to the present invention.

In FIG. 23 illustrated in block form an apparatus which embodies the fractal pattern generating method described above. Reference numeral 51 denotes a pixel value memory for storing a generated pattern, 52 a control part for controlling the operation of the apparatus, 53 a square area apex calculating part for calculating coordinate values of four apexes of a given square area stored in the memory 51, 54 a rhombic area apex calculating part for calculating coordinate values of four apexes of a given of at least three rhombic areas stored in the memory 51, 55 a diagonal pair apexes selecting part for sorting four apexes defined by the apex calculating part 53 or 54 into two pairs of diagonally opposite apexes and for selecting either one of the two pairs of apexes, 56 a center-point pixel value calculating part for calculating the pixel value Pc at the midpoint between the two apexes selected by the diagonal pair apexes selecting part 55, 57 a random generating part for generating a random number which is used to randomly select the diagonally opposite pair apexes, 58 a noise generating part, and 59 a writing part for writing calculated pixel values into the memory 51. In FIG. 23 the double-lined arrows indicate flows of pixel values and the single-lined arrows flows of coordinate values and other data values or control signals.

Figure 24:
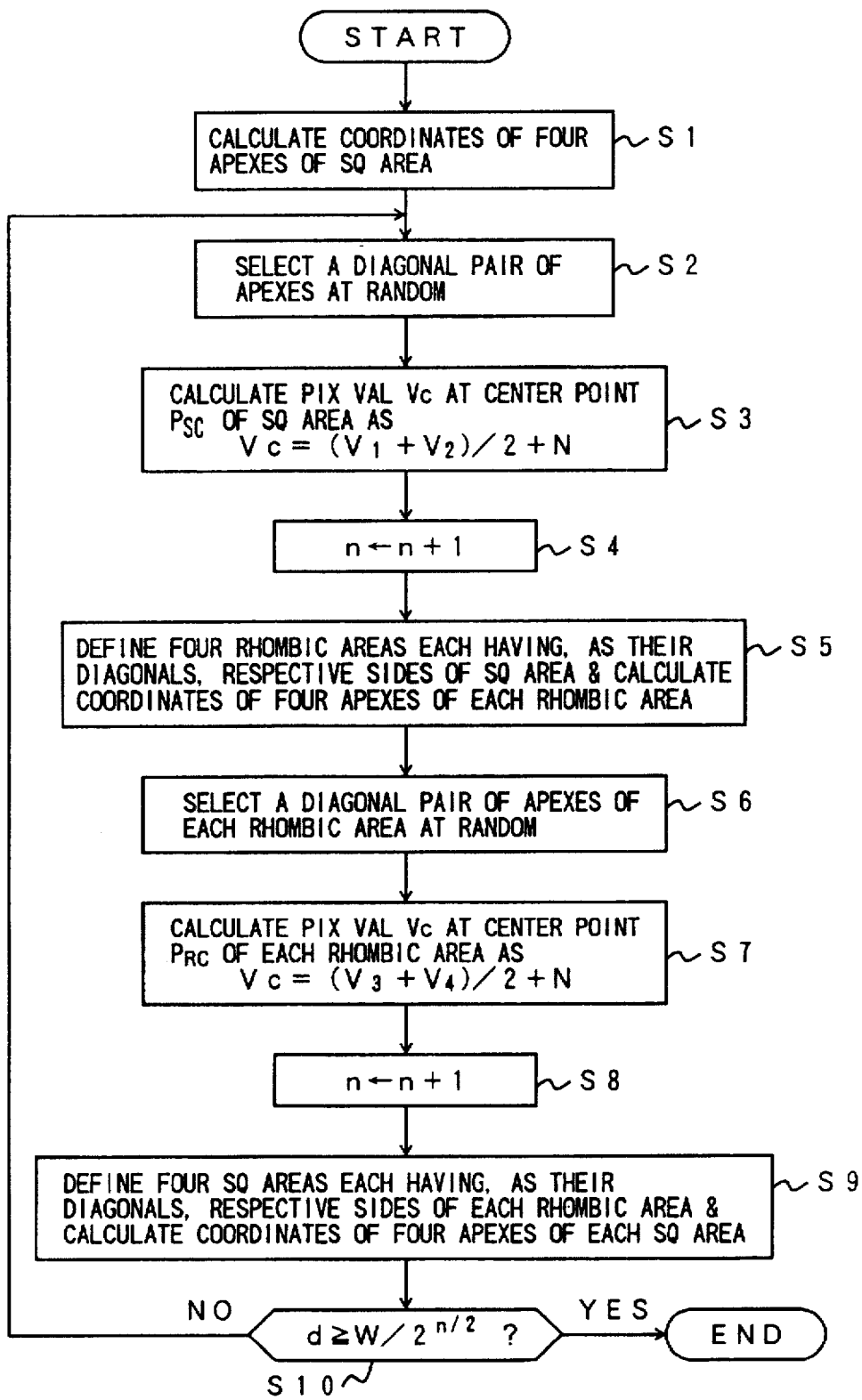
FIG. 24 is a flowchart showing a procedure for generating a fractal pattern by the apparatus of FIG. 23.

Next, a description will be given, with reference to FIG. 24, the generation of a fractal pattern with the configuration of FIG. 23.

In the memory 51 there are prewritten proper pixel values at four apexes of the original square area. Let the length of one side of the original square area be represented by W. The length W may take any value, but in this case, it is supposed to be a power of 2 of the inter-pixel distance which most simplifies the operation, such as 16, 32, 64, 128, 256, ...

The control part 52 instructs the square area apex calculating part 53 to calculate the coordinates of the four apexes of the original square area on the basis of the length W of its one side defined in the pixel value memory 51. The square apex calculating part 53 calculates coordinates (0,0), (W,0), (W,W) and (0,W) of the four apexes of the square area (see FIG. 25A) instructed by the control part 52 and sends them to the diagonally opposite apexes selecting part 55 (step S1).

The selecting part 55 sorts the four apexes sent from the square apex calculating part 53 into two pairs of diagonally opposite apexes, then selects either one of the pairs on the basis of the value sent from the random generating part 57 and sends their coordinate values to the center-point pixel value calculating part 56 (step S2). The square apex calculating part 53 thereafter calculates the coordinate of the midpoint between the apexes of the selected pair as the center point $P_{sc}$ of the square area and sends it to the writing part 59 as an address. The random generating part 57 generates a random number which is used for the selecting part 55 to randomly select one of the two pairs of diagonally opposite apexes. For example, the random generating part 67 generates a random number R in the range of from 0 to 1 and the selecting part 55 selects the pair of apexes diagonally opposite in a direction from the lower left to the upper right or from upper left to the lower right of the square area, depending upon whether R<0.5 or R≧0.5. By this, either pair of diagonally opposite apexes can be selected with the same probability.

Next, in step S3 the center-point pixel value calculating part 56 reads out from the memory 51 the pixel values $V_1$ and $V_2$ at the coordinates of the apexes of the selected pair sent from the selecting part 55, then calculates the average value of the pixel values $V_1$ and $V_2$ and adds the average value with a noise value N sent from the noise generating part 58, thereafter sends the added value as the pixel value Vc at the center point $P_{sc}$ of the square area to the writing part 59. The intensity N of the noise, which is generated by the noise generating part 58, changes in response to the instructions from the control part 52.

The writing part 59 writes the pixel value Vc calculated in the center-point pixel value calculating part 56, in accordance with the coordinate instructed by the selecting part 55. With this operation ends the first division of the square area into rhombic ones, and the number n of times the division has been made is incremented by one in step S4.

Figure 25A:
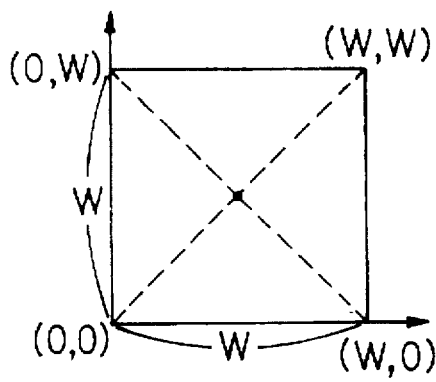
FIG. 25A is a diagram showing an original square area in the fractal pattern generating procedure according to the present invention.
Figure 25B:
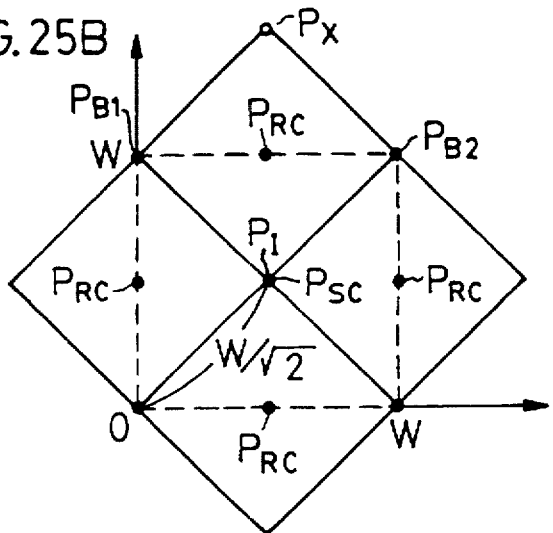
FIG. 25B is a diagram showing the formation of rhombic areas in the fractal generation.

Next, in step S5 the control part 52 divides the length W stored therein by $2^{1/2}$ and instructs the rhombic area apex calculating part 54 to calculates coordinates of four apexes of each of four rhombic areas having each side of a length $W/2^{1/2}$ shown in FIG. 25B, that is, four rhombic areas each using one side of the square area as its diagonal. At the same time, the control part 52 instructs the noise intensity N to the noise generating part 58. The rhombic area apex calculating part 54 calculates the coordinates of the four apexes of each rhombic area having each side of the length $W/2^{1/2}$ (FIG. 25B) instructed by the control part 52 and sends the thus calculated coordinate values to the selecting part 55.

In step S6 the diagonal pair apexes selecting part 55 sorts the four apexes of each rhombic area sent thereto into two pairs of diagonally opposite apexes. If the four apexes are all in the original area, the selecting part 55 selects a pair of vertically or horizontally opposite apexes of the rhombic area, depending on whether the random number R sent from the random generating part 57 is smaller than 0.5 or equal to or larger than 0.5, and the selecting part 55 sends coordinate values of the apexes of the selected pair to the center-point pixel value calculating part 56. If one of the four apexes is outside the original square area, the selecting part 55 selects a pair of diagonally opposite apexes both of which are on the side of the original square area and sends their coordinate values to the center-point pixel value calculating part 56. After this, the center-point pixel value calculating part 56 calculates the coordinate values of the midpoint between the apexes of each selected pair as the center point $P_{RC}$ of each rhombic area and sends it to the writing part 59.

In step S7 the center-point pixel value calculating part 56 reads out of the memory 51 pixel values $V_3$ and $V_4$ at the coordinates of the two diagonally opposite apexes sent for each rhombic area, then calculates the average of the read-out pixel values and adds the average value with the noise value N sent from the noise generating part 58, thereafter sending the added value as the pixel value Vc of the center point $P_{RC}$ to the writing part 59.

The writing part 59 writes the pixel value Vc calculated in the pixel value calculating part 56 into the memory 51 in accordance with the coordinate of the center point $P_{RC}$ between the selected apexes, and the number n of times the division has been performed is incremented by one in step S8.

Figure 26A:
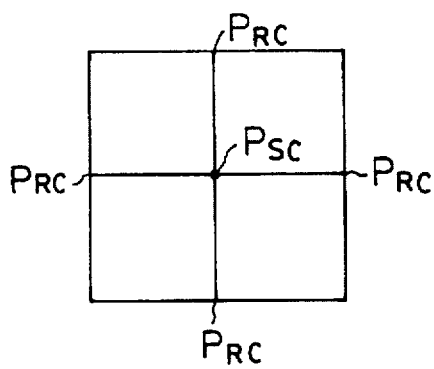
FIG. 26A is a diagram showing first-divided square areas in the fractal generation.

In step S9 four divided square areas, each of which uses one side of the rhombic area as its diagonal line and has each side of a length W/2 as shown in FIG. 26A, are defined, with which the first division of the rhombic area into square areas is completed.

Figure 26B:
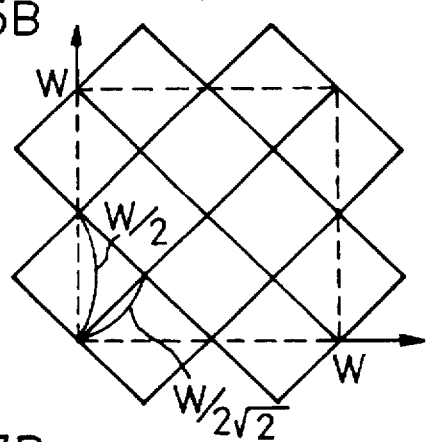
FIG. 26B is a diagram showing first-divided rhombic areas in the fractal generation.
Figure 27A:
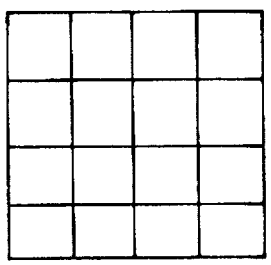
FIG. 27A is a diagram showing second-divided square areas in the fractal generation.
Figure 27B:
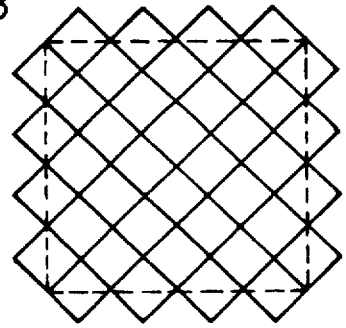
FIG. 27B is a diagram showing second-divided rhombic areas in the fractal generation.
Figure 28A:
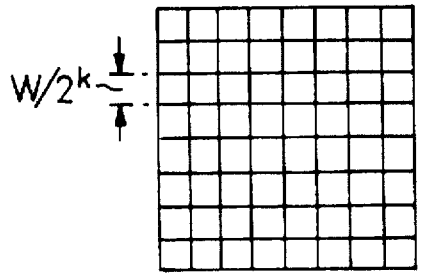
FIG. 28A is a diagram showing third-divided square areas in the fractal generation.
Figure 28B:
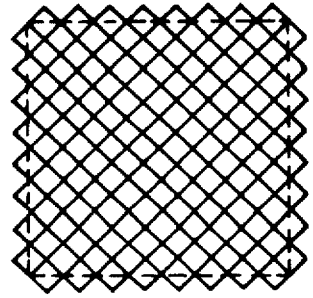
FIG. 28B is a diagram showing k-th divided rhombic areas in the fractal generation.

Next, in step S10 a check is made to see if the length $W/2^{n/2}$ of one side of each divided square area is equal to or shorter than the distance d between adjacent pixels (or pitch d of the pixels). If not, the process returns to step S2, in which one side of the square area having each side of the length W/2, obtained in step S9, is divided again by $2^{1/2}$ to obtain the length $W/2^{3/2}$ of one side of a rhombic area which has the side of the length W/2 as its diagonal line as shown in FIG. 26B. This length W/2 is used to divide the square area (FIG. 27A) into rhombic areas (27B), followed by the division of each rhombic area (27B) into square areas (28A). At the time of extracting four apexes of the rhombic area according to its length of one side, the rhombic area apex calculating part 54 extracts all rhombic areas having the same length $W/(2^{1/2}2^k)$ in one side as shown in FIG. 28B in accordance with k-th processing and calculates the coordinates of the four apexes of each extracted rhombic area (step S5). When selecting four apexes of each square area according to the length of each side, the square-area apex calculating part 53 extracts all square areas having the same length $W/2^k$ in each side as shown in FIG. 28A in accordance with k-th processing and calculates the coordinates the four apexes of each square area (step S9). When the value obtained by dividing the length W by $2^{n/2}$ becomes smaller than the distance d between adjacent pixels, the operation is stopped in step S10.

The above-described division processing is repeated, and when the control part 42 stops its operation, there is stored in the memory 51 a fractal pattern thus generated.

As described above, this embodiment permits effective generation of a fractal pattern on a rectangular area defined by a square area or a set of square areas without wasting the storage and the operation time unlike the prior art. Furthermore, this scheme is based on the division of the quadrangle, but since only two diagonally opposite apexes are used to calculate the center point, the division of the quadrangle is essentially the division of a rectangular equilateral triangle as shown in FIG. 22A or 25A; thus, the fractal pattern by this embodiment has a texture very close to that of the pattern by the conventional fractal method using the regular triangle division scheme and is free from the unnaturalness inherent in the fractal pattern based on the quadrangle division scheme.

Figure 29A:
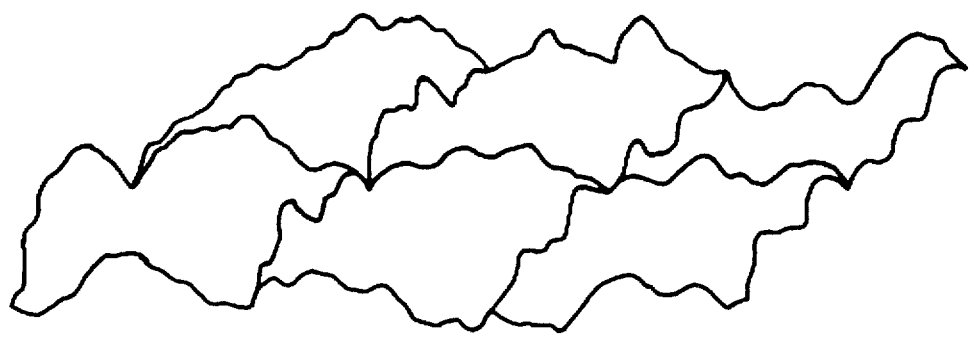
FIG. 29A is a diagram schematically showing the concentration distribution of interconnected fractal patterns.
Figure 29B:
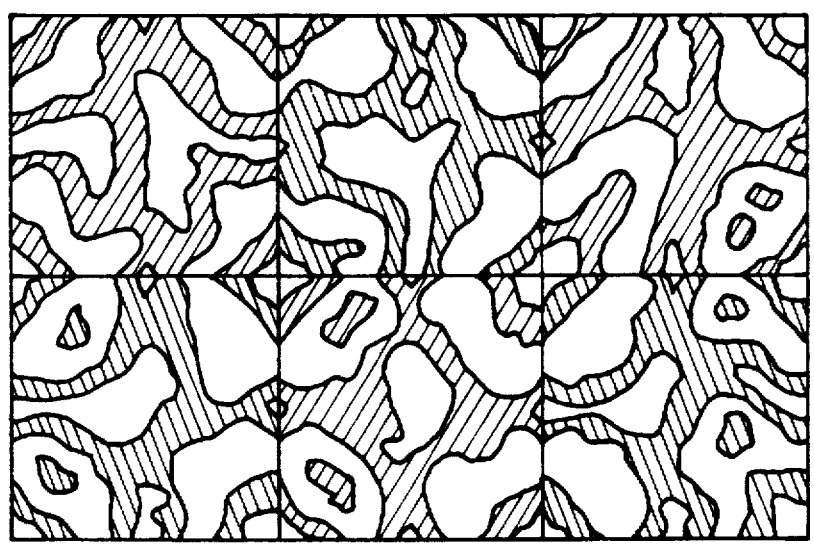
FIG. 29B is a diagram showing an example of fractal patterns edged at the joints of patterns across the boundaries of them.

Also in the case of square or rectangular areas of tiles or carpets each bearing the fractal pattern formed by the fractal pattern generating method according to the present invention, it is also desirable that when such areas are arranged in large numbers, their patterns be continuous with each other between adjacent areas to form a smooth pattern as a whole. Moreover, when tiles bearing the same pattern are merely arranged in the same orientation, the same textured pattern repeats itself every tile, resulting in the respective tiles being made noticeable individually. However, if patterns of individual tiles can be made to continue across their boundaries when the tiles are laid in different orientations or a small number of tiles having different patterns are laid, the patterns can be seen in their entirety—this improves the appearance over the entire area of, for example, a tiled wall surface. As is the case with the afore-mentioned pattern element, the fractal pattern can also be generated which meet the pattern continuation conditions described previously with respect to FIGS. 1A, 1B and 1C. In this instance, however, when the afore-mentioned pattern continuation conditions are merely used intact, the continuity of pixel values across the boundaries of tiles is guaranteed, but since the continuity of the rate of change of pixel value is not guaranteed, the pattern undergoes undesirable changes along the boundary area as depicted in FIGS. 29A and 29B. FIG. 29A is a diagrammatic three-dimensional showing of six fractal patterns each generated in a square area, with the pixel value represented as height. The adjacent patterns have the same height at the boundaries between them, but the gradient at the boundaries varies discontinuously. In FIG. 29B there are shown patterns generated by mapping pixel values above a certain value, with lower pixel values indicated in white. This stripe information has the same meaning as do contour lines used in maps and the like. Unless the pixel value gradients continue at the boundaries of the patterns, their contours do not smoothly continue either and become rugged at the joints of patterns. On this account, the boundaries of the patterns become conspicuous as shown in FIG. 29, degrading the quality of the patterns. Conversely speaking, if the pixel value gradients smoothly vary across the boundaries of adjacent areas, the contours of the patterns will also smoothly continue.

Hence, in order that not only the pixel value but also its rate of change may smoothly vary across the boundary of adjacent areas, it is necessary to calculate pixel values, taking into account information on adjacent patterns in the division procedure in the fractal generation. An embodiment based on this idea will be described hereinbelow.

Since the division of the areas described previously with respect to FIGS. 22A through 22C utilizes only information about the inside of the square area, this embodiment will use the afore-mentioned processing. The division of the rhombic area into square areas will be carried out taking into account information about adjacent tile pattern, because of the presence of rhombic areas which lie across the boundaries of the original square area of the tile. That is to say, when the rhombic area is detected which has one of its four apexes outside the original square area, a point or points in the square area of the adjoining tile which correspond to the position of the above-said one apex are sequentially selected, for example, with respect to four sides of the adjoining tile that can be made to continue by rotating it. The number of points that are selected depends on the continuation condition and the number of different patterns to be generated. Under the condition that patterns of the noted tile and the adjacent one continue across the boundaries of them when they are arranged with their patterns held in the same orientation, one pixel is selected; under the condition that the patterns of the both tiles continue across the boundaries of them when they are arranged with their patterns held 180° apart in orientation, two pixels are selected; and under the conditions that the patterns of the both tiles continue across the boundaries of them when they are arranged with their patterns held 90°, 180° and 270° apart in orientation, four pixels are selected. Furthermore, when the pattern of the noted tile is intended to be continued with patterns of a plurality of tiles, the number of pixels that are selected is a multiple of the number that depends on the continuation conditions. Letting the number of pixels or points thus selected be represented by Q, one of a total of Q pairs of apexes of the above-mentioned rhombic area inside the original square area and points thus selected in the adjacent tile plus a pair of diagonally opposite apexes of the rhombic area on one side of the original square area is randomly selected, and a value, which is obtained by adding the amount of noise to the average value of pixel values at the two apexes of the selected pair, is used as the pixel value at the center of the above-said rhombic area. By this, a set of rhombic areas is divided into a set of square areas. Then, the fractal pattern is generated by repeating the square-to-rhombic division procedure and the rhombic-to-square division procedure alternately with each other until the length of one side of the divided square area becomes equal to the distance between adjacent pixels.

Figure 30:
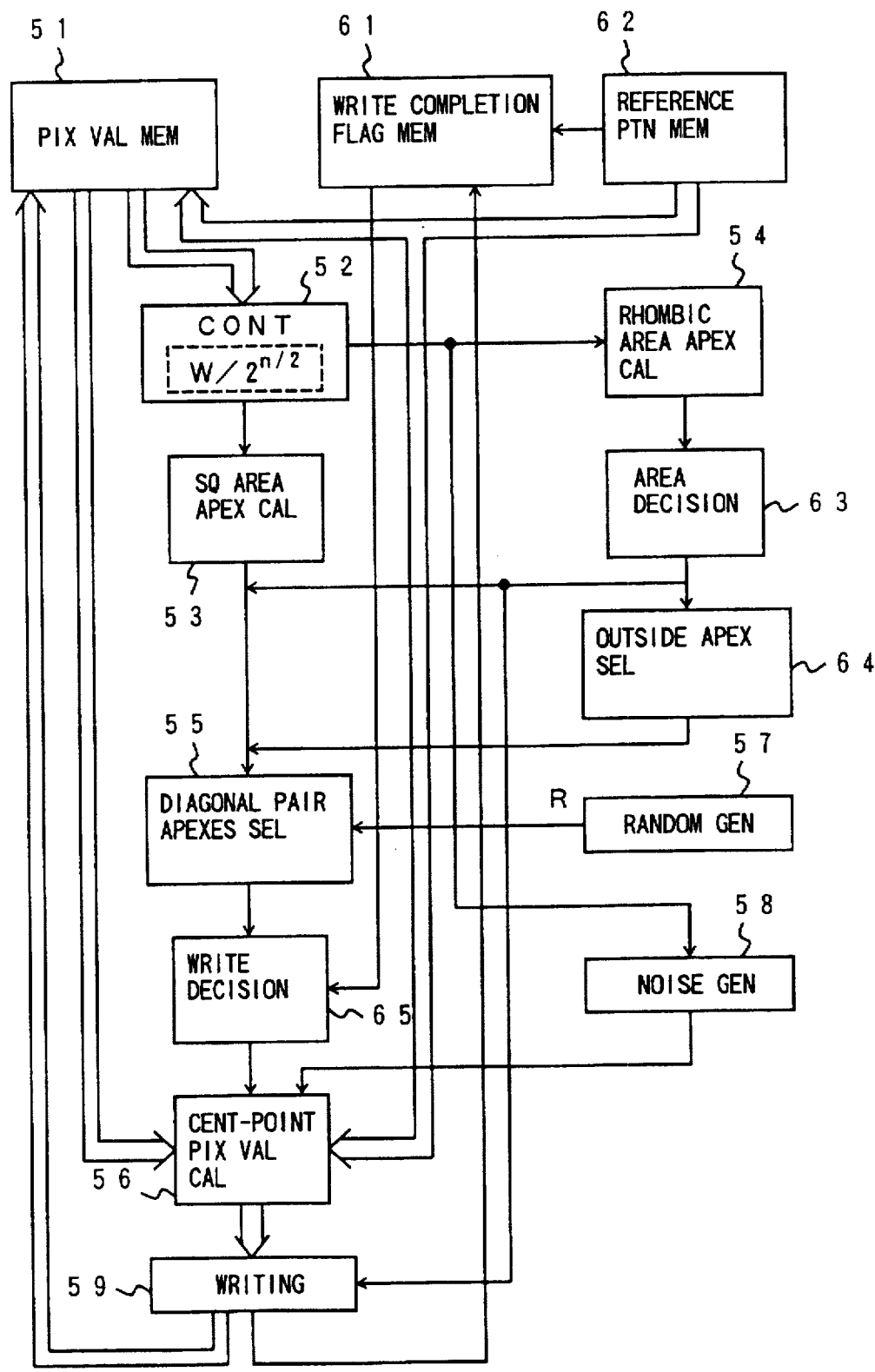
FIG. 30 is a block diagram illustrating an embodiment of an apparatus for generating fractal patterns whose pixel value gradients continue across the boundary of them.

FIG. 30 illustrates in block form an embodiment of a fractal generating apparatus based on the idea described above. The parts which are identical in designation and operation with those in FIG. 23 embodiment are identified by the same reference numerals as in FIG. 23. This embodiment differs from the FIG. 23 embodiment in the provision of: a write completion flag memory 61 which indicates that pixel values have already been stored in the pixel value memory 51; a reference pattern pixel value memory 62 which is used to generate a plurality of tile patterns continuous across the tile boundary; area decision part 63 which decides whether all apexes of the rhombic area calculated by the rhombic-area apex calculating part 54 are inside the original square area or one of them is outside the original square area; an outside apex selecting part 64 which selects a plurality of pixels in a pattern of the adjacent square area at the apex of the rhombic area outside the original square area and outputs the number of selected pixels, their coordinate values and the patterns where the selected pixels are present; and a write decision part 65 which checks whether or not the center point coordinate calculated in the diagonal pair apexes selecting part 55 has already been written. Incidentally, the double-lined arrows in FIG. 30 indicate flows of pixel values and the single-lined arrows flows of coordinate values and other data values or control signals.

In the case of generating a single tile pattern, there are already written in the memory 51 the same pixel values at the four apexes of the original square area in the memory 51 and in the flag memory 61 there are set write-indicating flags at the four apexes of the original square area accordingly. Let the length of one side of the original square area be represented by W. In the case of generating a plurality of tile patterns which continue a pre-generated tile pattern across the boundary between them, pixel values of a reference pattern are written in all pixels belonging to the sides of the square area in the pixel value memory 51 and write-indicating flags are set at all pixels belonging to the sides of the square area in the write completion flag memory 61. Incidentally, the reference pattern pixel value memory 62 need not be provided when there is no need of generating a plurality of patterns which continue across the boundaries of tiles.

The control part 52 instructs the square area apex calculating part 53 to calculate the coordinates of the four apexes of the original square area.

The square area apex calculating part 53 calculates, as shown in FIG. 25A, the coordinates of the four apexes of the square area from the length W of its one side predefined in the memory 51 and sends the coordinates to the diagonally-opposite apexes selecting part 55.

As in the FIG. 13 embodiment, the selecting part 55 sorts the four apexes, sent from the square area apex calculating part 53, into two pairs of diagonally opposite apexes, then selects either one of the two pairs of apexes on the basis of the random value R sent from the random generating part 57, and sends their coordinate values to the write decision part 65, thereafter calculating and sending the coordinate of the midpoint between the selected pair of apexes to the writing part 59.

The write decision part 65 refers to the flag memory 61 to see if writes have already been effected at the coordinates sent from the selecting part 55; if written, the writes in the coordinates are stopped. When no writes have been effected, their coordinate values are sent to the center-point pixel value calculating part 56.

The center-point pixel value calculating part 56 reads out of the memory 51 the pixel values $V_1$ and $V_2$ corresponding to the two coordinate values sent from the write decision part 65, then calculates the average value of the read-out pixel values and sends it to the writing part 59 after adding it with the noise value N which is provided from the noise generating part 58. The intensity N of the noise generated by the noise generating part 58 changes in response to instructions from the control part 52.

The writing part 59 writes the pixel value of the center point, calculated in the center-point pixel value calculating part 56, in the memory 51 in accordance with the specified coordinate of the center point $P_{sc}$ between the diagonally opposite apexes selected in the selecting part 55 and set a write-indicating flag at the same coordinate in the flag memory 61. At this time, if that coordinate value is on one side of the square area which has the length W, the writing part 59 writes, following the pattern continuation conditions described previously in respect of FIGS. 1A and 1B, the same coordinate value at the coordinates of a total of eight positions, that is, the position on the above-said side of the square area, its sifted position on the opposite side and the positions on the both sides sequentially rotated 90°, 280° and 270°. At the same time, the writing part 59 sets flags at the corresponding coordinates in the flag memory 61. With this processing ends the first square-to-rhombic division. In this embodiment, pixel values on only a predetermined side of the square area are determined by the above-described calculation and the pixel values are copied to the remaining other sides in accordance with the above-described pattern continuation conditions.

Next, the control part 52 divides the length W stored therein by $2^{1/2}$, then instructs the rhombic area apex calculating part 54 to calculate the coordinates of the four apexes of a rhombic area whose one side has a length $W/2^{1/2}$ and specifies the noise intensity N to the noise generating part 58.

The rhombic-area apex calculating part 54 calculates, as depicted in FIG. 25B, the coordinates of the four apexes of the rhombic area having one side of the length $W/2^{1/2}$ specified by the control part 52 and sends the calculated coordinate values to the area decision part 63.

The area decision part 63 makes a check to determine if the four apexes represented by the coordinate values are inside the original square area or one of the apexes is outside it, and sends the coordinate values of the apexes inside the original square area to the selecting part 55 and the coordinate value of the apex outside the original square area to the outside apex selecting part 64. When one of the four apexes of the rhombic area is outside the original square area, other two apexes are on the sides of the original square area and the remaining apex is inside the original square area; let the coordinates of these apexes be represented by $P_X$, $P_{B1}$, $P_{B2}$ and $P_I$, respectively. In the state of FIG. 25A, the apex $P_I$ coincides with the center point $P_{sc}$.

Figure 31:
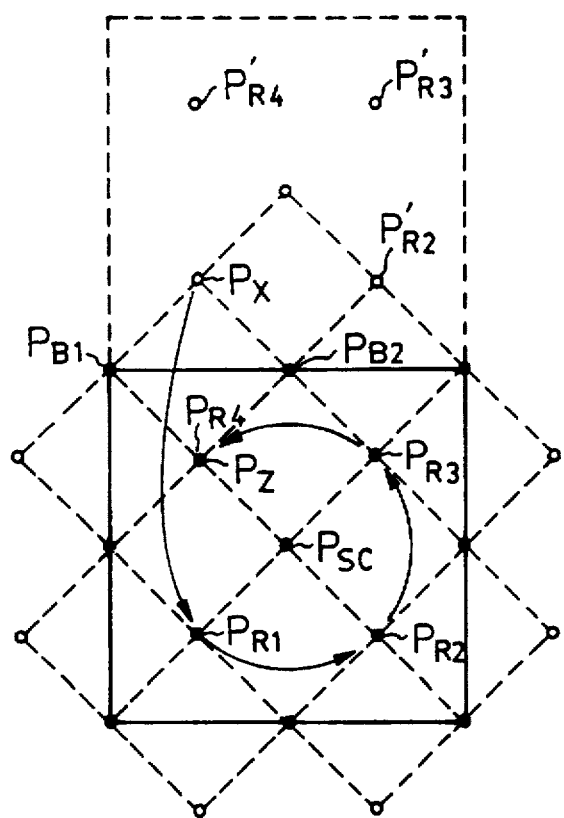
FIG. 31 is a diagram for explaining the selection of a pixel when apexes of rhombic area are outside of a square area.

The outside apex selecting part 64 selects four coordinates $P_{R1}$, $P_{R2}$, $P_{R3}$ and $P_{R4}$ at the position of the coordinate PX sent from the area decision part 63 and placed on the noted tile, regarding the coordinate $P_X$ as that on an adjacent tile which satisfies the pattern continuation conditions and corresponds to the coordinate on the noted tile, and at the positions of the coordinate $P_X$ rotated on the noted tiles through 90°, 180° and 270° one after another, as shown in FIG. 31. In the state of FIG. 25B, since the coordinate $P_x$ coincides with the center point of the adjacent square area, these four positions also coincide with the center point $P_{sc}$, but in the state of FIG. 26B, these four points are obtained as shown in FIG. 31. In the case of generating a fractal pattern different from the original one, the pattern of the adjacent tile is stored as the fractal pattern of the original tile in the memory 62 and the point $P_X$ is selected together with positions $P_{R2}'$, $P_{R3}'$ and $P_{R4}'$ to which the point $P_X$ has been rotated 90°, 180° and 270° on the original tile. In the generation of a first tile pattern (the original pattern), information representing that these four coordinates are those in the memory 51 is provided to the selecting part 55 together with those coordinates, and in second and subsequent steps of generating different patterns, information representing that the four coordinates are those in the reference pattern memory 62 is provided to the selecting part together with the coordinates.

When it is decided in the area decision part 63 that the four apexes of the rhombic area are all inside the original square area, the selecting part 55 sorts the four apexes provided from the rhombic area apex calculating part 54 into two pairs of diagonally opposite apexes, then randomly selects either one of the two pairs in accordance with the random number R provided from the random generating part 57 and provides a pair of coordinate values of the selected apexes to the center-point pixel value calculating part 56. When it is decided in the area decision part 63 that one of the four apexes is outside the original square area, the selecting part 55 receives the four coordinates $P_x$, $P_{B1}$, $P_{B2}$ and $P_I$ from the rhombic area apex calculating part 54 and the four coordinates $P_{R1}$, $P_{R2}$, $P_{R3}$ and $P_{R4}$ from the outside apex selecting part 64. The selecting part 55 defines two pairs of diagonally opposite apexes ($P_{XI}$, $P_I$) and ($P_{B1}$, $P_{B2}$) on the basis of the former quartet of coordinates and selects pixel values of the latter quartet of coordinates as the pixel values that the apex $P_X$ outside the original square area is allowed to take. That is, the selecting part 55 selects, as selectable diagonally opposite apexes of the rhombic area, a total of five pairs of apexes such as a pair of two apexes ($P_{B1}$, $P_{B2}$) on one side of the original square area and pairs ($P_I$, $P_{R1}$), ($P_I$, $P_{R2}$), ($P_I$, $P_{R3}$) and ($P_I$, $P_{R4}$) of the apex $P_I$ inside the square area and selected coordinates. The selecting part 55 selects one of the five pairs of apexes in accordance with the random number R and provides the selected pair of coordinates to the center-point pixel value calculating part 56 together with information representing that the coordinate values of the selected pair are those in the memory 51 or 61. In either case, the selecting part 55 calculates the coordinate of the midpoint of the coordinates of the selected pair and provides it to the write decision part 65.

The write decision part 65 refers to the flag memory 61 to check whether a write has already been effected in the write coordinate; if so, the write in that coordinate is stopped. If no write has been effected, the write decision part 65 sends the corresponding coordinate value to the center-point pixel value calculating part 56.

The center-point pixel value calculating part 56 reads out of the memory 51 or 62 the pixel values at the two coordinates of the coordinate pairs provided from the selecting part 55, then calculates the average value of the read-out pixel values and sends it to the writing part 59 after adding the average value with the noise value N fed from the noise generating part 58.

The writing part 59 writes the pixel value, calculated in the center-point pixel value calculating part 56, into the memory 51 at the coordinate selected by the selecting part 55. With this processing ends the first rhombic-to-square division, and the square area is provided as a set of square areas.

Next, the control part 52 subdivides the length $W/2^{1/2}$ stored therein by $2^{1/2}$. By this, the length $W/2$ of one side of each of the four divided square areas is obtained. Then, the square-to-rhombic division is performed on the basis of the length $W/2$, followed by the rhombic-to-square division using a length $W/2^{3/2}$. This pair of procedures are repeated until the length $W/2^{n/2}$ of one side of the divided square area stored in the control part 52 becomes equal to the distance between adjacent pixels. When selecting four apexes of a square area whose diagonal length is $W/2^{n/2}$ (n=1, 3, 5, ....), the square area apex calculating part 53 calculates the coordinates of the four apexes of all square areas common in the length of one side in accordance with (n=k)th processing as shown in FIG. 28A. When selecting four apexes of a rhombic area corresponding to the diagonal length $W/2^{n/2}$ (n=2, 4, 6, ....), the rhombic-area apex selecting part 54 calculates the coordinates of four apexes of each of all rhombic areas common in the length of one side as shown in FIG. 28B in accordance with (n=k)th processing.

The above-described division processing is repeated and when the control part 52 stops its operation, there are generated and stored in the memory 51 fractal patterns which are continuous across the boundaries of the tiles.

In the fractal patterns generated as described above, not only the pixel value but also its rate of change smoothly continue across the boundaries of tiles; therefore, the fractal patterns are free from undesirable pattern changes at the boundary area due to discontinuity of the rate of change of the pixel value such as shown in FIGS. 29A and 29B. Moreover, if the pattern that is referred to when selecting the pixel at the apex outside the rhombic area is referred to not only by the original fractal patter but also by another fractal pattern, the both fractal patterns can made to continue across their boundary.

While in the above embodiment the method and apparatus of the present invention have been described as being applied to the generation of the fractal pattern in a square tile area, a fractal pattern can also be generated in a rectangular are defined by a set of square area through a simple modification of this embodiment. For example, a fractal pattern having an aspect ratio of 1 to 2 can be produced by generating two kinds of square-area fractal patterns which continue across the boundary of them by the method of this embodiment and connecting them together. A fractal pattern can also be generated in a rectangular area of a given aspect ratio by compressing or elongating the pattern in a lateral direction. In this instance, too large a compression or elongation rate introduces directionality in the texture of the pattern and hence is not preferable; this problem could be solved by generating a pattern beforehand in a rectangular area of the aspect ratio closest to the desired one, defined by a set of square areas, and slightly compressing or expanding it for conversion into a rectangular area of the intended aspect ratio.

While the embodiment has been described to generate the fractal pattern on a two-dimensional plane, it is needless to say that the invention can easily be applied to the generation of cubic fractal patterns which smoothly continue across the boundaries of them, by extending the afore-mentioned processing on the x- and y-axes to processing on the x-, y- and z-axes and by replacing the mutual division between square and rhombic areas with the mutual division between cubic and octahedral areas.

Although the foregoing embodiments have been described to write the tile pattern into the tile area defined in the pattern data memory 18 or 51, the pattern may also be printed out directly through the use of a printer or plotter, for instance. Alternatively, it is possible to store the pattern data in a floppy disk, IC card or similar detachable recording medium and read out therefrom the data for printing the pattern as required. Also it is possible to draw the pattern on the surface of a plate-like member through the use of a numerically controlled machine tool on the basis of the pattern data read out of such a recording medium, instead of printing the pattern.

It will be apparent that many modifications and variations may be effected without departing from the scope of the novel concepts of the present invention.

What is claimed is:

1. A method which generates a tile pattern by repeatedly writing a predetermined pattern element in a polygonal tile area and in which a square area including said pattern element is defined as a stamp area and a boundary area where said stamp area, whenever placed there, spreads across the boundary of said tile area and an inner area where said stamp area, when placed there, does not spread across said boundary are defined in said tile area, said method comprising the steps of:

(a) randomly generating the center position of said stamp area in said tile area;

(b) making a check to see if the stamp area having its position specified by said center position is inside said boundary area or inside said inner area;

(c) if said stamp area is inside said inner area, writing said pattern element at said specified position of said stamp area;

(d) if said stamp area is inside said boundary area, shifting an outer portion of said pattern element which extends out of said boundary into an adjacent polygonal area to a position of said adjacent polygonal area on said tile area when said adjacent polygonal area is laid on top of said tile area, and effecting an additional write at positions to which that portion of said pattern element which does not spread across said boundary and said shifted portion were rotated a predetermined angle about the center of said tile area at least once in accordance with a connecting condition of said tile; and (e) when said additional write has been effected, effecting at least one additional write in said inner area.

2. The method of claim 1, wherein said polygonal area is a rectangular area and said predetermined angle in said step (d) includes 180°.

3. The method of claim 2, wherein said rectangular area is a square area, said predetermined angle in said step (d) further includes 90° and 270° and said additional write is effected at 90°-, 180°- and 270°-rotated positions, respectively.

4. The method of claim 3, wherein said pattern element is prestored as a pixel value at each address of a pattern element memory means which defines therein said stamp area, and said step (d) includes a step if sequentially generating addresses for reading out pixel values from said stamp area in said pattern element memory means and a step of sequentially accessing addresses of said stamp area of said pattern element memory means with said addresses to read out therefrom pixel values.

5. The method of claim 4, further comprising a step of generating a combined address by combining coordinate specifying said center position and said readout address, and said step (d) includes a step of calculating a residue by performing a residue operation to modulus the length of one side of said tile area with respect to said combined coordinate, generating, as a write address, a coordinate obtained by rotating said residue by said angle of rotation, and writing said pixel value, read out of said pattern element memory means, into data memory means as said write address.

6. The method of claim 4, further comprising the steps of: rotating said address said rotational angle about the center of said stamp area to generate rotated address; rotating said center coordinate said rotational angle about the center of said tile area to generate a rotated coordinate; combining said rotated address and said rotated coordinate to obtain a combined coordinate; generating, as a write address, a residue resulting from performing a residue operation to modulus the length of one side of said tile area with respect to said combined coordinate; and writing said pixel value at the position of said write address in said data memory means.

7. The method of claim 1 or 4, wherein the number of additional writes in said inner area is equal to the number of additional writes in said boundary area.

8. The method of claim 1 or 4, wherein the number of additional writes is set such that the density of pattern elements in said boundary area and the density of pattern elements in said inner area become substantially equal to each other.

9. The method of claim 1 or 4, wherein the orientation of said pattern element is rotated, for each write of said pattern element, by an angle corresponding to predetermined possible orientations for connection of said polygonal tile in any of said steps (c), (d) and (e).

10. The method of claim 1 or 4, wherein said step (b) includes a step of writing in memory means the write position of said stamp area decided to spread across said boundary in the generation of a first tile pattern, and the generation of a second tile pattern comprises the steps of:

33

(f) reading out said write position from said memory means;

(g) writing said pattern element at said read-out write position in said boundary area; and (h) letting the area ratio of said inner area and said boundary area be represented by $S_I/S_B$, randomly generating the center position of said stamp area in a range of said inner area by the number of times about $S_I/S_B$ times the number of times of writing in said boundary area in said step (g) and writing said pattern element at said center position.

11. The method of claim 10, wherein said write by said step (g) and said write by said step (h) are effected mixedly.

12. The method of claim 10, wherein said steps (g) and (h) are mixedly performed by a differential digital analysis method so that the number of writes by said step (g) and the number of writes by said step (h) may bear said ratio of $S_I/S_B$.

13. The method of claim 10, wherein that one of said steps (g) and (h) which is larger in the number of writes is executed first by the number of times corresponding to the difference in the number of writes therebetween and then said steps (g) and (h) are performed alternately with each other.

14. An apparatus which generates a tile pattern by repeatedly writing a predetermined pattern element in a polygonal tile area and in which a square area including said pattern element is defined as a stamp area and a boundary area where said stamp area, whenever placed there, spreads across the boundary of said tile area and an inner area where said stamp area, when placed there, does not spread across said boundary are defined in said tile area, said apparatus comprising:

pattern element source means which outputs said pattern element;

center coordinate generating means which randomly generates in said tile area the center position of said stamp area which specifies the position in said square area where said pattern element is to be written;

decision means which decides whether said stamp area where said pattern element has been specified to be written by said center position of said stamp area is inside said boundary area or inside said inner area; and write means responsive to the results of decision by said decision means, which, when said stamp area is in said inner area, writes said pattern element at said specified position in said stamp area and which, when said stamp area is in said boundary area, shifts an outer portion of said pattern element which extends out of said boundary into an adjacent polygonal area to a position on said tile area where said adjacent polygonal area is laid on top of said tile area, and effects an additional write at positions to which an inner portion of said pattern element which lies inside said boundary and said shifted portion are rotated a predetermined angle about the center of said tile area at least once in accordance with a connecting condition of said tile, which effects at least one additional write in said inner area when said additional write was made.

15. The apparatus of claim 14, wherein the number of additional writes in said inner area a number determined such that the density of pattern elements in said boundary area and the density of pattern elements in said inner area become substantially equal to each other.

16. The apparatus of claim 14, which further comprises pattern rotating means for rotating the orientation of said

34 pattern element for each write of said pattern element by an angle corresponding to predetermined possible orientations for connection of said polygonal tile.

17. The apparatus of claim 14 or 16, which further comprises memory means where the write position of said stamp area decided to spread across said boundary is written in the generation of a first tile pattern, and wherein said center coordinate generating means includes means for randomly generating center position of said stamp area in said inner area in the generation of a second tile pattern and said write means includes means, which reads out said write position from said memory means and writes said pattern element at said read-out write position in the generation of said second tile pattern, and letting the area ratio of said inner area and said boundary area be represented by $S_I/S_B$, writes said pattern element at said write position by the number of times about $S_I/S_B$ times larger than that of writing in said boundary area.

18. The apparatus of claim 17, wherein said write means includes means for mixedly effecting the write in said boundary area and the write in said inner area in the generation of said second tile pattern.

19. The apparatus of claim 17, which further comprises means for mixedly performing the writes in said inner rear and said boundary area by a differential digital analysis method so that the number of writes in said inner area and the number of writes in said boundary area may bear said ratio of $S_I/S_B$.

20. A method which writes a pixel value of a pattern in an area of a polygonal tile for each pixel so that the pattern may continue across the boundary of the tiles arranged side by side, said method comprising the steps of:

(a) writing a pixel value of a pattern in said tile area for each pixel;

(b) making a check to see if said written pixel of the pattern is adjacent any one of sides of said polygonal area;

(c) when said pixel written in said step (b) is adjacent any one of the sides of said polygonal area, calculating the position of a pixel adjacent said written pixel on the area of an adjacent polygonal area adjacent said polygonal area along said side thereof and calculating, as a shifted position of said adjacent pixel, the position of said adjacent pixel when said adjacent polygonal area is laid on top of said tile area;

(d) rotating the position of said written pixel and said shifted position about the center of said polygonal area at least once through a predetermined angle and calculating the rotated positions; and (e) writing said pixel value at said shifted position and said rotated positions.

21. The method of claim 20, wherein said polygonal area is a rectangular area and said predetermined angle includes 180°.

22. The method of claim 20, wherein said polygonal area is a square area and said predetermined angle is 90°, 180° and 270°.

23. The method of claim 20, wherein said polygonal area is a regular triangular area and said predetermined angle is 120° and 240°.

24. The method of claim 20, wherein said polygonal area is a regular hexagonal area and said predetermined angle is 60°, 120°, 180°, 240° and 300°.

25. An apparatus which generates by writing a pixel value of a pattern in an area of a polygonal tile area for each pixel so that the pattern may continue across the boundary of the tiles arranged side by side, said apparatus comprising:

pattern data source means;

coordinate address generating means which specifies the position in said polygonal area where said pattern data from said pattern data source means is to be written for each pixel;

decision means which decides whether said coordinate address is adjacent to any one of sides of said polygonal area;

position rotating means which, when said written pixel is adjacent any one of said sides of said polygonal area, calculates the position of a pixel adjacent said written pixel on a polygonal area adjacent said side of said polygonal area, calculates, as a shifted position of said adjacent pixel, the position of said adjacent pixel when said adjacent polygonal area is laid on said polygonal tile area, and calculating rotated positions of the position of said written pixel and said shifted position by rotating said positions predetermined angle about the center of said polygonal area at least once; and additional write means which additionally writes said pixel value at said shifted position and said rotated positions.

26. The apparatus of claim 25, wherein said polygonal area is a rectangular area and said predetermined angle is 180°.

27. The apparatus of claim 25, wherein said polygonal area is a square area and said predetermined angle is 90°, 180° and 270°.

* * * * *